(12) United States Patent
Wojdyla et al.

(10) Patent No.: US 9,605,466 B2
(45) Date of Patent: Mar. 28, 2017

(54) MOTORIZED VEHICULAR SYSTEM WITH AUTOMATED DOOR ASSEMBLY

(71) Applicant: The Braun Corporation, Winamac, IN (US)

(72) Inventors: Adam Wojdyla, Winamac, IN (US);
Michael R. Pugh, Winamac, IN (US);
Sajed Dosenbach, Winamac, IN (US);
Christopher Wegner, Winamac, IN (US); Greg Perkins, Winamac, IN (US)

(73) Assignee: The Braun Corporation, Winamac, IN (US)

( * ) Notice: Subject to any disclaimer, the term of this patent is extended or adjusted under 35 U.S.C. 154(b) by 21 days.

(21) Appl. No.: 14/645,877

(22) Filed: Mar. 12, 2015

(65) Prior Publication Data

US 2016/0236546 A1    Aug. 18, 2016

Related U.S. Application Data

(63) Continuation of application No. 14/623,729, filed on Feb. 17, 2015.

(51) Int. Cl.
*A61G 3/06* (2006.01)
*E05F 15/632* (2015.01)
(Continued)

(52) U.S. Cl.
CPC ............ *E05F 15/632* (2015.01); *A61G 3/065* (2013.01); *B60J 5/047* (2013.01); *B60J 5/0493* (2013.01); *B60J 5/06* (2013.01); *B60R 3/02* (2013.01); *B62D 47/00* (2013.01); *E05B 81/04* (2013.01); *E05B 81/70* (2013.01); *E05D 3/147* (2013.01); *E05D 15/06* (2013.01); *E05D 15/101* (2013.01); *E05F 1/14* (2013.01); *E05F 15/73* (2015.01);
(Continued)

(58) Field of Classification Search
CPC ......... E05F 1/14; E05F 15/649; E05F 15/614; E05D 3/18; A61G 3/061; A61G 3/065
USPC ....................................... 296/146.4
See application file for complete search history.

(56) References Cited

U.S. PATENT DOCUMENTS 3,275,370 A * 9/1966 Smith ...................... B60J 5/047
296/148
6,860,543 B2 * 3/2005 George ..................... B60J 5/047
296/146.12

(Continued)

FOREIGN PATENT DOCUMENTS

EP          2261449 B1     8/2012
WO     WO 2007046793 A1 *  4/2007 ............. A61G 3/061

*Primary Examiner* — Pinel Romain
(74) *Attorney, Agent, or Firm* — Taft Stettinius & Hollister, LLP; Ryan O. White

(57) ABSTRACT

A door assembly for a motorized vehicle includes a door configured to move between an open position and a closed position, a first member defining a first axis, and a first support member pivotally coupled to the door and defining a second axis. A linkage assembly includes a first arm and a second arm. The first arm and the second arm are pivotally coupled to one another, where the first arm is coupled to the first member at a location offset from the first axis and the second arm defines a first slot. A cross member has a first end and a second end. The first end has a first pin for slideably engaging the first slot and the second end being coupled to the first member. The door is movable between the open and closed positions as the first member pivots about the first axis.

20 Claims, 15 Drawing Sheets

(51) Int. Cl.
*E05F 15/73* (2015.01)
*B60J 5/06* (2006.01)
*E05B 81/04* (2014.01)
*E05B 81/70* (2014.01)
*E05D 15/06* (2006.01)
*B60J 5/04* (2006.01)
*B60R 3/02* (2006.01)
*B62D 47/00* (2006.01)
*E05D 3/14* (2006.01)
*E05D 15/10* (2006.01)
*E05F 1/14* (2006.01)
*E05D 3/18* (2006.01)
*E05F 15/42* (2015.01)
*E05F 15/614* (2015.01)
*E05F 15/649* (2015.01)

(52) U.S. Cl.
CPC .............. *A61G 3/061* (2013.01); *E05D 3/18* (2013.01); *E05F 15/42* (2015.01); *E05F 15/614* (2015.01); *E05F 15/649* (2015.01); *E05Y 2201/22* (2013.01); *E05Y 2800/11* (2013.01); *E05Y 2900/531* (2013.01)

(56) References Cited

U.S. PATENT DOCUMENTS

| | | | |
|---|---|---|---|
| 7,364,219 B2* | 4/2008 | Lowson | B60J 5/062 296/146.1 |
| 8,807,575 B2* | 8/2014 | Bartel | A61G 3/061 280/6.152 |
| 2007/0062118 A1* | 3/2007 | Lindemann | B60J 5/06 49/209 |
| 2010/0289299 A1* | 11/2010 | Kitayama | E05D 15/1007 296/202 |
| 2014/0248109 A1* | 9/2014 | Johnson | A61G 3/061 414/537 |
| 2014/0356118 A1* | 12/2014 | Friedlinghaus | A61G 3/061 414/523 |

* cited by examiner

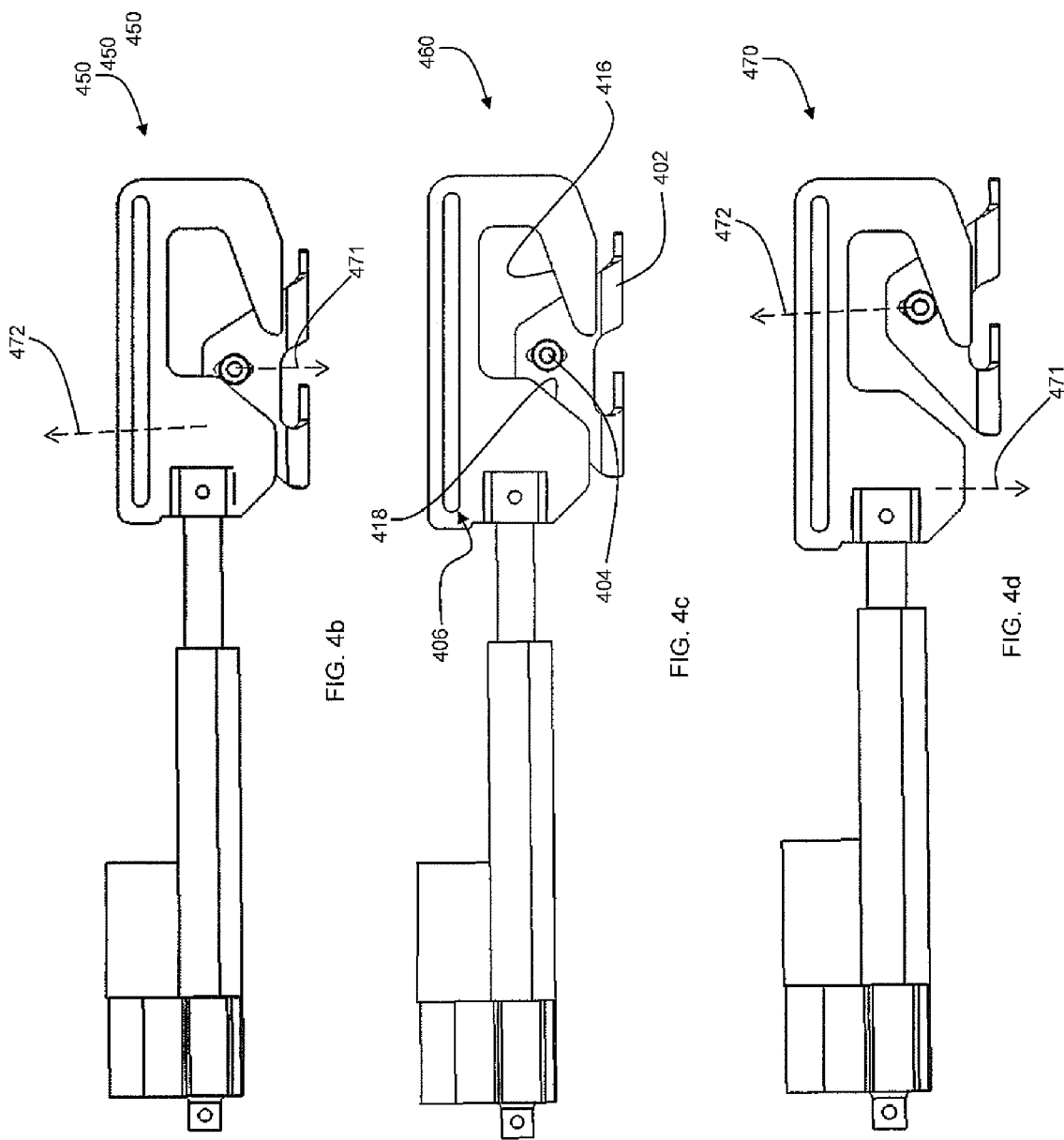

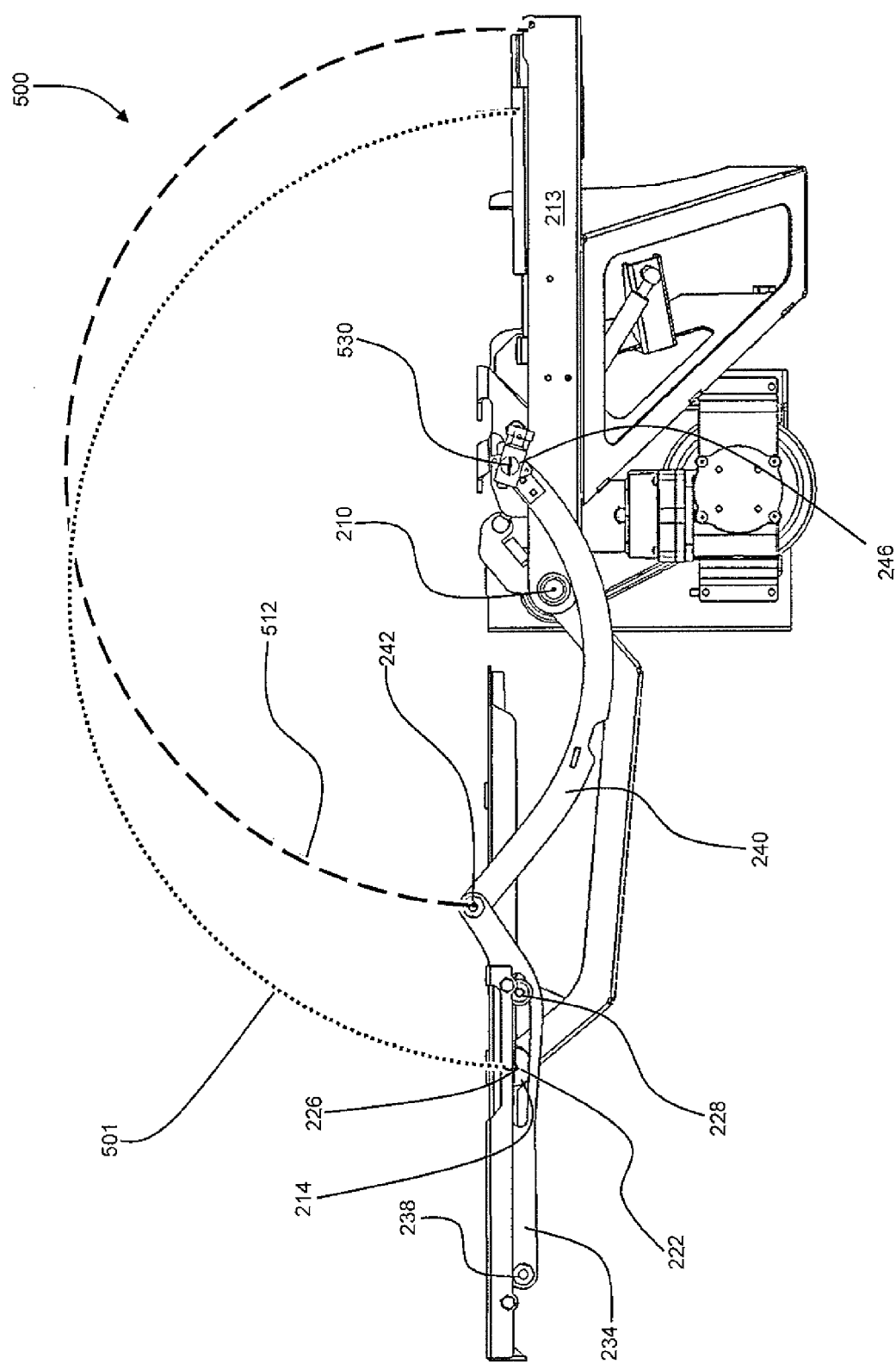

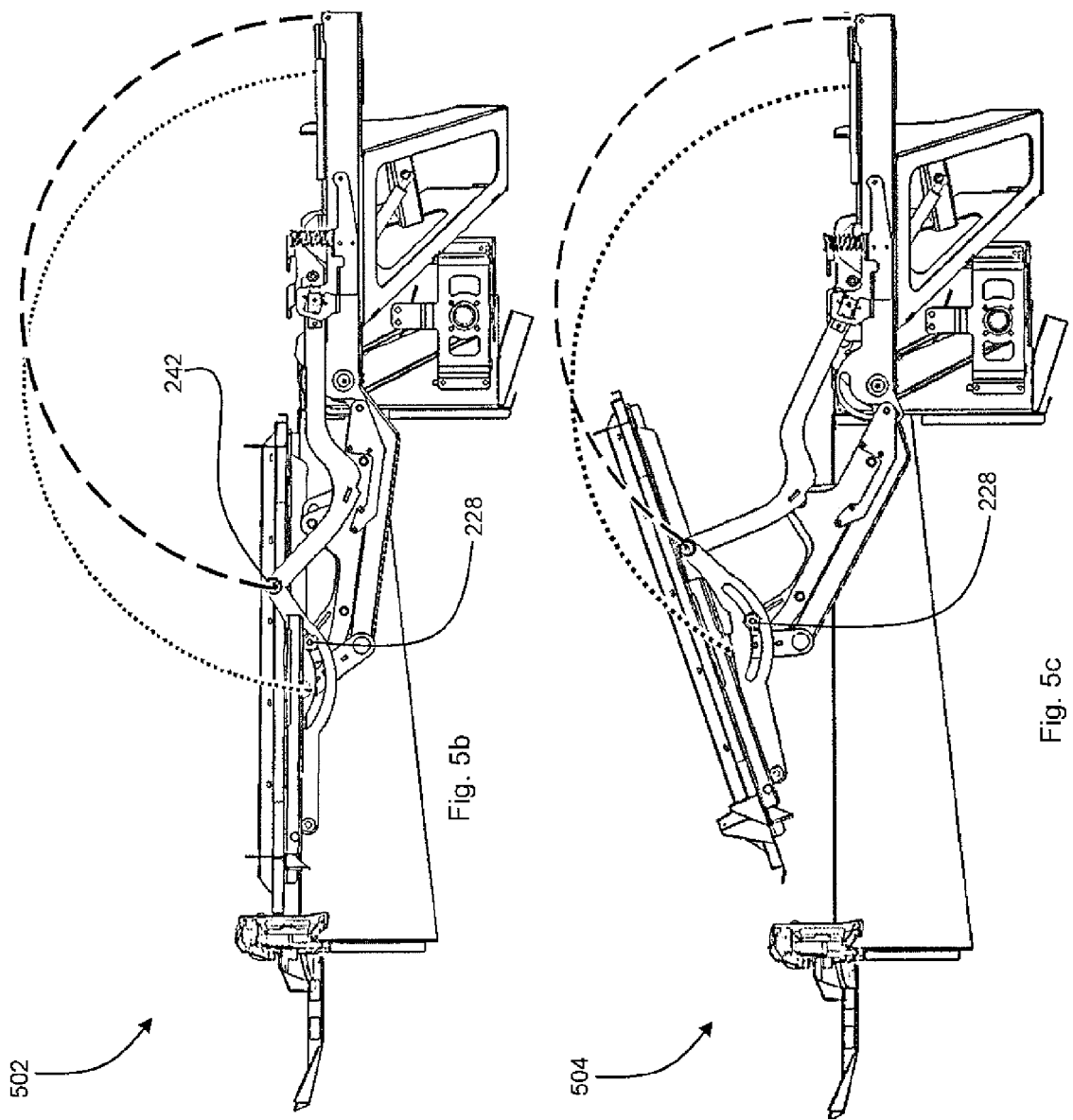

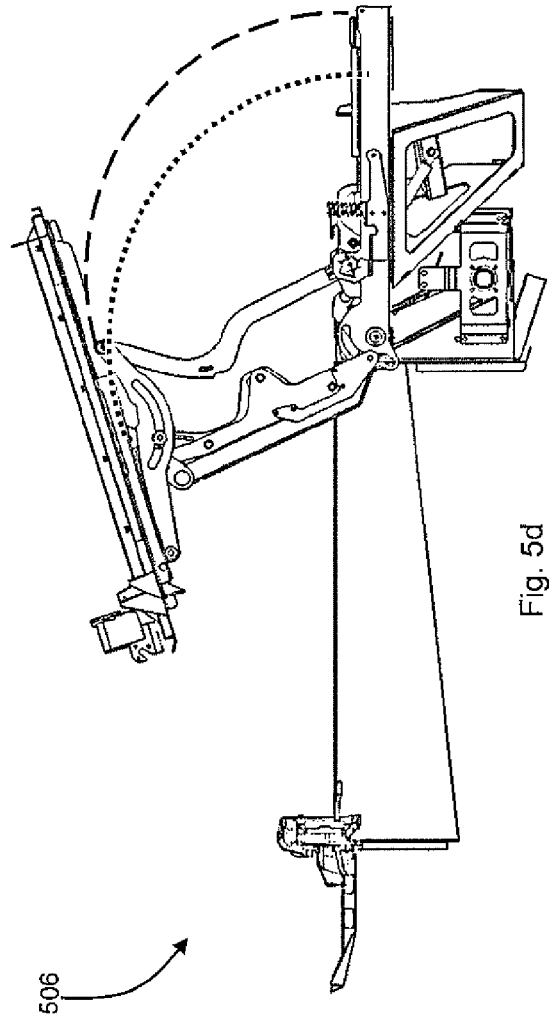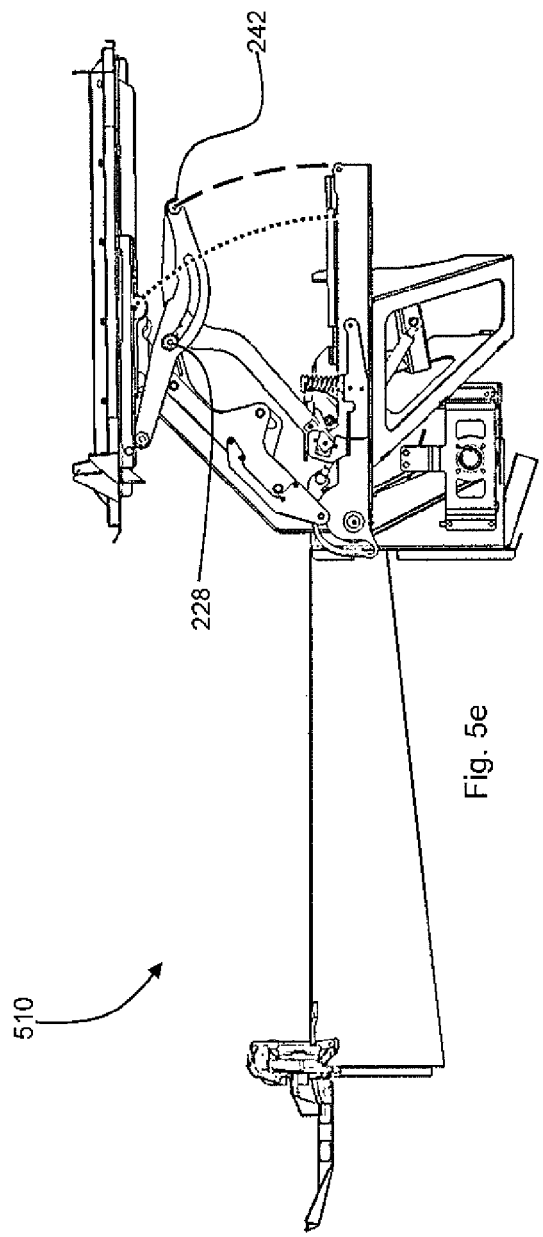

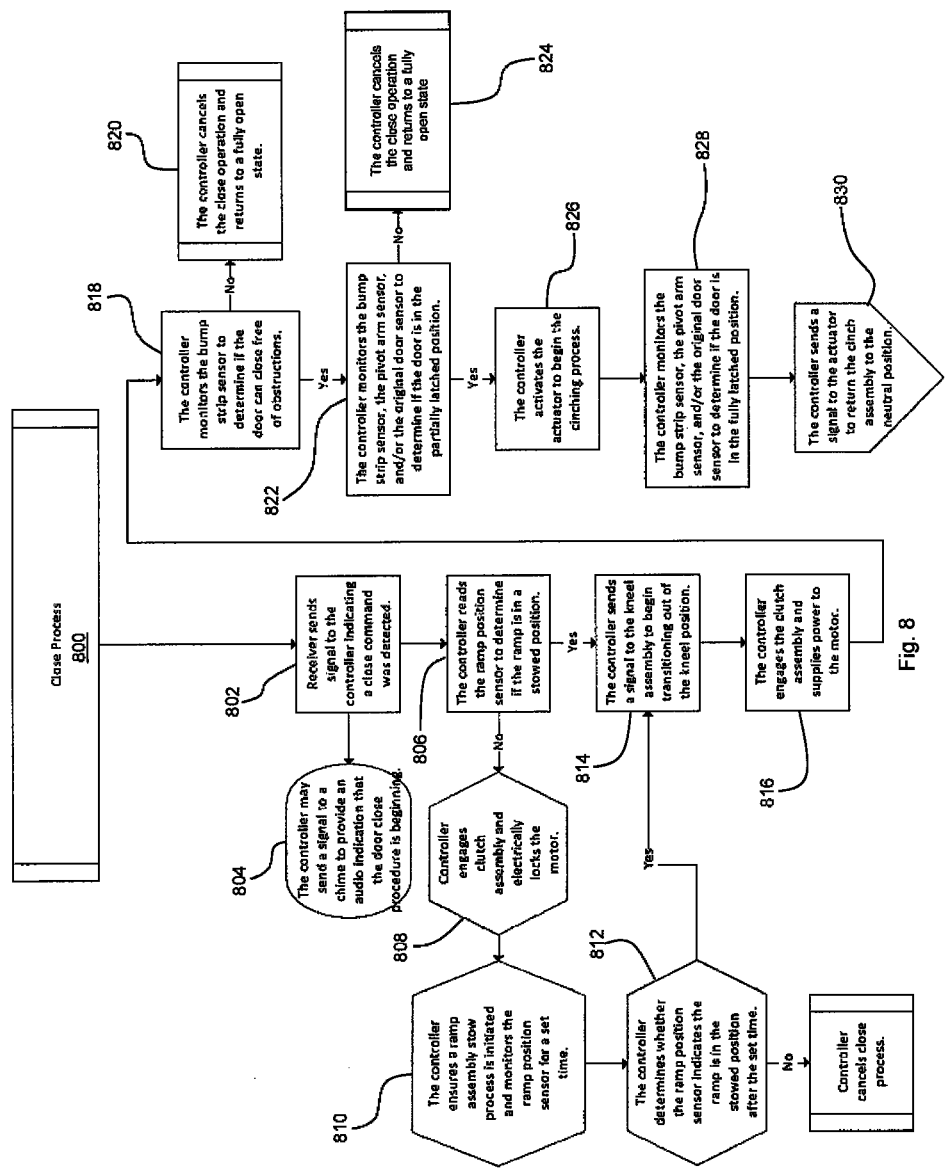

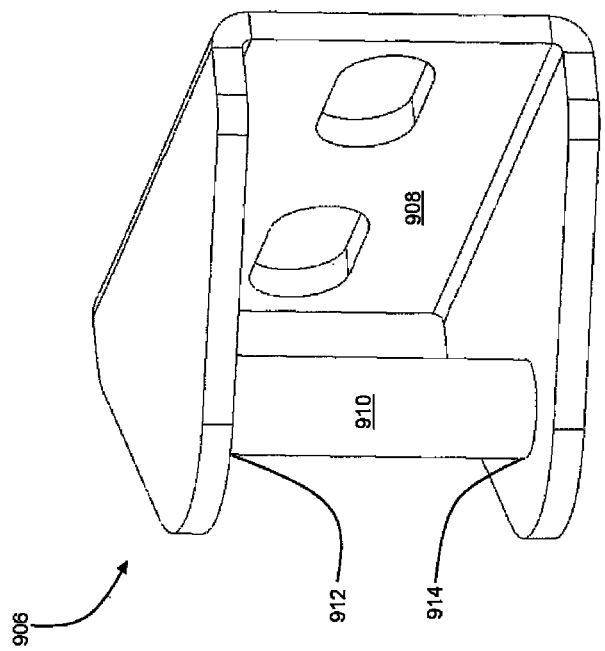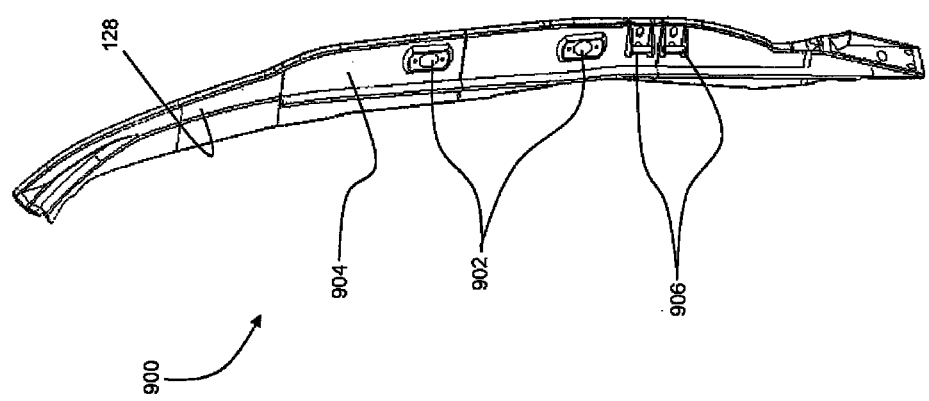

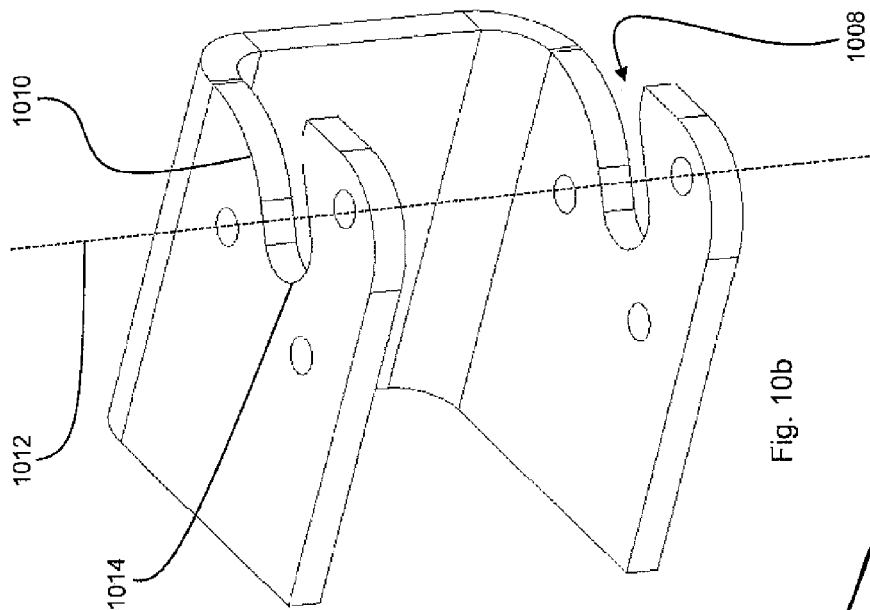
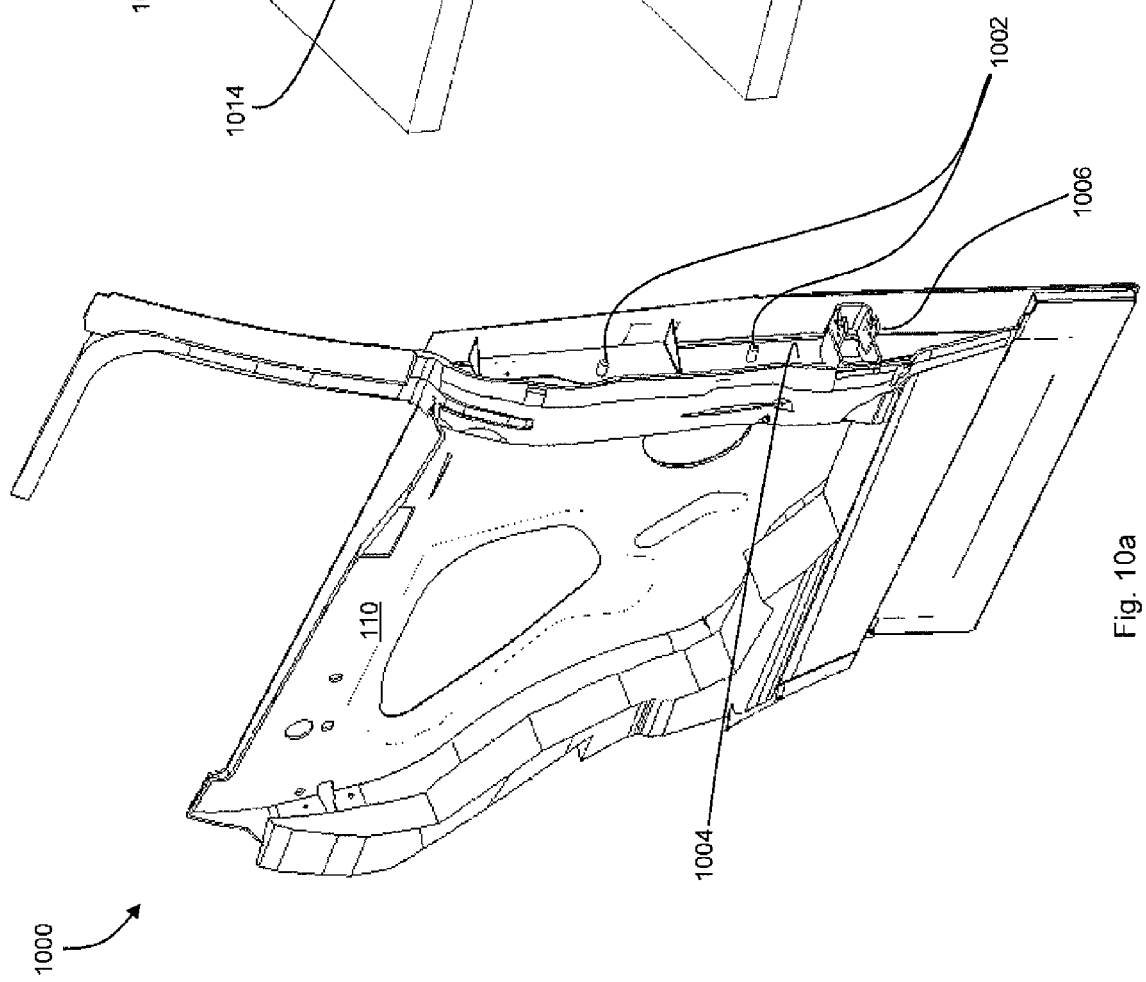

MOTORIZED VEHICULAR SYSTEM WITH AUTOMATED DOOR ASSEMBLY

RELATED APPLICATIONS

This application is a continuation application of U.S. patent application Ser. No. 14/623,729, filed on Feb. 17, 2015, which is hereby incorporated by reference in its entirety.

FIELD OF THE DISCLOSURE

The present disclosure relates to a motorized vehicle for transporting one or more passengers, and more particularly to a motorized vehicle which is retrofitted for transporting one or more physically limited passengers seated in a wheelchair.

BACKGROUND

Automobile manufacturers do not currently mass-produce passenger vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example in one configuration, a van may be retrofitted with a ramp to enable a physically limited individual using a wheelchair to enter the vehicle without the assistance of another individual.

Other known level change devices for retrofitting a vehicle, such as a van, include wheelchair lifts, lift platforms, and lowered floor surfaces. In some instances, a door of an original equipment manufacturer (OEM) van is enlarged or otherwise modified to permit entry of the physically limited individual through what is known as the assisted entrance. Once inside the van, individuals who use the assisted entrance are often located in a rear passenger compartment of the van adjacent to or behind the assisted entrance.

Most, if not all, motorized vehicles modified to include a ramp or lift for transporting physically limited passengers are passenger vans or buses. Minivans, or passenger vans, are often referred to as multi-purpose vehicles (MPVs), people movers, or multi-utility vehicles. At least in the United States, minivans are classified as light trucks or MPVs. In many instances, these vans have rear access doors on each side thereof that, when opened, define a door opening that can provide easy ingress and egress of a wheelchair.

Crossover and sport-utility vehicles have become popular due to their style and driving performance. Sport-utility vehicles are built off a light-truck chassis similar to passenger vans, whereas crossover or crossover utility vehicles are built from a passenger car chassis. Due to their build, crossover vehicles are often more fuel efficient than heavier, sport-utility vehicles and include other advantages over minivans and sport-utility vehicles.

SUMMARY

In one embodiment of the present disclosure, a door assembly for a motorized vehicle includes a door configured to move between an open position and a closed position; a first member defining a first axis; a first support member pivotally coupled to the door and defining a second axis; a linkage assembly including a first arm and a second arm, the first arm and the second arm being pivotally coupled to one another, where the first arm is coupled to the first member at a location offset from the first axis and the second arm defines a first slot; and a cross member having a first end and a second end, the first end having a first pin for slideably engaging the first slot and the second end being coupled to the first member; wherein, the door is movable between the open and closed positions as the first member pivots about the first axis.

In one example of this embodiment, a bracket defines a second slot therein, the bracket being pivotably coupled to the first member at a first location and the first arm at a second location, where the first location is spaced from the second location. In another example, the second slot comprises a profile having a first portion and a second portion, the first portion defined by a first radius and the second portion defined by a second radius; wherein the first radius and second radius are different from one another. In a third example, a second support member defining a third axis, the third axis being spaced from and parallel to the first and second axes; and a connecting arm pivotally coupled to the first support member and the second support member.

In a fourth example, the connecting arm is pivotally coupled to the first support member about the second axis and pivotally coupled to the second support member about the third axis. In a fifth example, a third arm defines a third slot and including a second pin; wherein, the connecting arm includes a third pin; further wherein, the third pin is slidably disposed within the third slot and the second pin is slidably coupled to the second slot. In a sixth example, the cross member includes a plurality of defined slots; and the third arm includes a plurality of pins, where each of the plurality of pins is slidably disposed within each of the plurality of slots; wherein, the plurality of pins is movable within the plurality of defined slots in only an axial direction. In a seventh example, at least one door coupler pivotally coupling the first support member to the door.

In another embodiment, a door assembly for a motorized vehicle includes a door configured to move between an open position and a closed position; a first member defining a first axis; a first support member pivotally coupled to the door and defining a second axis; a linkage assembly including a first arm and a second arm, the first arm and the second arm being pivotally coupled to one another, where the first arm is coupled to the first member at a location offset from the first axis and the second arm defines a first slot; a cross member having a first end and a second end, the first end having a first pin for slideably engaging the first slot and the second end being coupled to the first member; and a drive assembly operably coupled to the first member; wherein, the door is movable between the open and closed positions as the drive assembly operably drives the first member about the first axis.

In one example of this embodiment, the drive assembly comprises an electric motor. In a second example, the drive assembly includes a gear set coupled to the motor; and a clutch assembly being disposable in an engaged position and a disengaged position, wherein, the motor is operably coupled to the first member in the engaged position and decoupled therefrom in the disengaged position. In a third example, the drive assembly includes a first sprocket coupled to the clutch assembly; a second sprocket coupled to the first member; and a drive chain coupled between the first sprocket and the second sprocket; wherein the motor operably drives the first and second sprockets via the drive chain in the engaged position.

In a fourth example, the door assembly includes a bracket including a pin, the bracket being coupled to the door; a cinching head having an open end that defines a first angled portion and a second angled portion; and an actuator coupled to the first member at a first end and the cinching head at a second end, where a movement of the actuator moves the cinching head in a first axial direction; wherein, the movement of the cinching head in the first axial direction induces a movement of the bracket in a second axial direction, wherein the second axial direction is substantially perpendicular to the first axial direction. In a fifth example, the door assembly further includes a spring mechanism coupled to the first member; wherein, the spring mechanism is disposable on a first side of the first axis to provide a force to maintain the door in the closed position; further wherein, the spring mechanism is disposable on a second side of the first axis to provide a force to maintain the door in the open position.

In a different embodiment, a door assembly for a motorized vehicle includes a door configured to move between an open and a closed position; a first member defining a first axis; a first support member pivotally coupled to the door and defining a second axis; a linkage assembly including a first arm and a second arm, the first aim and the second arm being pivotally coupled to one another, where the first arm is coupled to the first member at a location offset from the first axis and the second arm defines a first slot; a cross member having a first end and a second end, the first end having a first pin for slideably engaging the first slot and the second end being coupled to the first member; a drive assembly operably coupled to the first member; and a cinching assembly including an actuator and a cinching head, the actuator being coupled to the first member at a first end and the cinching head at a second end; wherein, the door is movable between the open and closed positions as the drive assembly operably drives the first member about the first axis.

In one example of this embodiment, the door assembly includes a bracket coupled to the door, the bracket including a pin; wherein, a movement of the actuator moves the cinching head in a first axial direction; further wherein, the movement of the cinching head in the first axial direction induces a movement of the bracket in a second axial direction, wherein the second axial direction is substantially perpendicular to the first axial direction. In a second example, a first slanted portion is defined on the cinching head, the first slanted portion configured to be engaged by the door to move the door to the closed position. In a third example, a second slanted portion is defined on the cinching head, the second slanted portion configured to be engaged by the door to move the door to the open position.

In a fourth example, the door assembly includes a spring mechanism having a first end and a second end, the first end being coupled to the first member at a distance offset from the first axis; wherein, the spring mechanism is disposable in a compressed position as the door moves between the open and closed positions. In a fifth example, the door assembly includes a connecting arm having a first end and a second end, the connecting arm including a second pin; a second support member defining a third axis, wherein the connecting arm is pivotally coupled to the first support member about the second axis and pivotally coupled to the second support member about the third axis; and a bracket pivotally coupled to the first member and the first arm, where the bracket defines a second slot.

In yet another embodiment, a motorized vehicle includes a body frame mounted on a chassis, where the chassis is adapted to support a vehicle powertrain and a plurality of wheels; a vehicle floor coupled to the body frame and chassis; a ramp assembly coupled to the vehicle floor, the ramp assembly being configurable in at least a stowed position and a deployed position to enable the wheelchair-occupied passenger ingress and egress to and from the interior; a door coupled to the body frame, the door configured to move between an open position and a closed position to provide access to an interior of the vehicle; a door assembly including a first member defining a first axis; a first support member pivotally coupled to the door and defining a second axis; a linkage assembly including a first arm and a second arm, the first arm and the second arm being pivotally coupled to one another, where the first arm is coupled to the first member at a location offset from the first axis and the second arm defines a first slot; and a cross member having a first end and a second end, the first end having a first pin for slideably engaging the first slot and the second end being coupled to the first member; wherein, the door is movable between the open and closed positions as the first member pivots about the first axis.

In one example of this embodiment, the vehicle includes a plurality of pillars forming part of the body frame, the plurality of pillars including at least a first pillar, a second pillar, and a third pillar, where the first pillar is disposed near a front end of the vehicle and the third pillar is disposed near a rear end thereof; and at least a second door coupled to the body frame and providing access to an interior of the vehicle.

In a different embodiment, a motorized vehicle includes a chassis; a powertrain and a plurality of wheels supported by the chassis; a body frame mounted on the chassis; a door coupled to the body frame, the door configured to move between an open position and a closed position to provide access to an interior of the vehicle; a first member defining a first axis; a first support member pivotally coupled to the door and defining a second axis; a linkage assembly including a first arm and a second arm, the first arm and the second arm being pivotally coupled to one another, where the first arm is coupled to the first member at a location offset from the first axis and the second arm defines a first slot; a cross member having a first end and a second end, the first end having a first pin for slideably engaging the first slot and the second end being coupled to the first member; and a drive assembly operably coupled to the first member; wherein, the door is movable between the open and closed positions as the drive assembly operably drives the first member about the first axis.

In one example of this embodiment, the vehicle includes a vehicle floor coupled to the body frame and chassis; and a ramp assembly coupled to the vehicle floor, the ramp assembly being configurable in at least a stowed position and a deployed position to enable the wheelchair-occupied passenger ingress and egress to and from the interior.

In a further embodiment, a vehicular system includes a body frame defining an interior; a door coupled to the body frame, the door configured to move between an open position and a closed position to provide access to the interior; a door assembly including a first member defining a first axis; a first support member pivotally coupled to the door and defining a second axis; a linkage assembly including a first arm and a second arm, the first arm and the second arm being pivotally coupled to one another, where the first arm is coupled to the first member at a location offset from the first axis and the second arm defines a first slot; and a cross member having a first end and a second end, the first end having a first pin for slideably engaging the first slot and the second end being coupled to the first member. The system further includes a control system including a controller having a plurality of inputs and a plurality of outputs; wherein, the door is movable between the open and closed positions as the first member pivots about the first axis.

In one example of this embodiment, the system includes a pivot arm sensor coupled to the first arm and configured to detect a position of the door relative to a current position of the first arm; wherein, the pivot arm sensor is disposed in electrical communication with one of the plurality of inputs of the controller for communicating the position of the door thereto. In another example, the system includes a ramp assembly coupled to the body frame, the ramp assembly being configurable in at least a stowed position and a deployed position to enable a wheelchair-occupied passenger ingress and egress to and from the interior; and a ramp position sensor disposed in electrical communication with one of the plurality of inputs of the controller for communicating the position of the ramp assembly thereto.

In a third example, the system includes a drive assembly operably coupled to the first member; a cinching assembly including an actuator and a cinching head, the actuator being coupled to the first member at a first end and the cinching head at a second end; a door actuator and a solenoid, the door actuator disposed in electrical communication with one of the plurality of outputs of the controller and the solenoid disposed in electrical communication with another of the plurality of outputs thereof; and an actuator position sensor disposed in electrical communication with one of the plurality of inputs of the controller, the actuator position sensor coupled to the actuator to detect a position of the cinching head and communicate said detected position to the controller; wherein, the controller is disposed in electrical communication with the drive assembly and cinching assembly to control movement of the door between the open and closed positions.

In a fourth example, the system includes a kneel assembly coupled to the body frame, the kneel assembly adapted to move the body frame between a kneel configuration and a ride configuration; and a kneel sensor disposed in electrical communication with one of the plurality of inputs of the controller, the kneel sensor detecting either the kneel configuration or ride configuration and communicating said detected configuration to the controller. In a fifth example, the system includes a bump strip sensor disposed in electrical communication with one of the plurality of inputs of the controller, the bump strip sensor coupled to the body frame, door, or door assembly, wherein the bump strip sensor is configured to detect an object at least partially disposed in a path travelled by the door between the open and closed positions and communicate said detection to the controller. In a sixth example, the system includes a signal receiver electrically coupled to one of the plurality of inputs of the controller, the signal receiver being in electrical communication with a transmitter for detecting an instruction to open or close the door, wherein the signal receiver is configured to receive the instruction and communicate the instruction to the controller.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 4b illustrates an isolated view of the cinching mechanism of FIG. 4a in a push position;

FIG. 4c illustrates an isolated view of the cinching mechanism of FIG. 4a in a neutral position;

FIG. 4d illustrates an isolated view of the cinching mechanism of FIG. 4a in a pull position;

FIG. 5a illustrates a top-side view of the door opening apparatus of FIG. 2 with the vehicle door removed;

FIG. 5b illustrates a top-side view of the door opening apparatus of FIG. 5a in a fully closed position;

FIG. 5c illustrates a top-side view of the door opening apparatus of FIG. 5a in a partially closed position;

FIG. 5d illustrates a top-side view of the door opening apparatus of FIG. 5a in a partially opened position;

FIG. 5e illustrates a top-side view of the door opening apparatus of FIG. 5a in a fully opened position;

FIG. 8 illustrates a flow chart of a close process for the control system of FIG. 6;

FIG. 9a illustrates an isolated perspective view of one embodiment of a B pillar of the motorized vehicle of FIG. 1;

FIG. 9b illustrates an elevated perspective view of a surface coupler of the B pillar of FIG. 9a;

FIG. 10a illustrates a partial perspective view of a vehicle door with the vehicle and door opening apparatus removed;

FIG. 10b illustrates an elevated perspective view of a pivot bracket of the vehicle door of FIG. 10a;

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
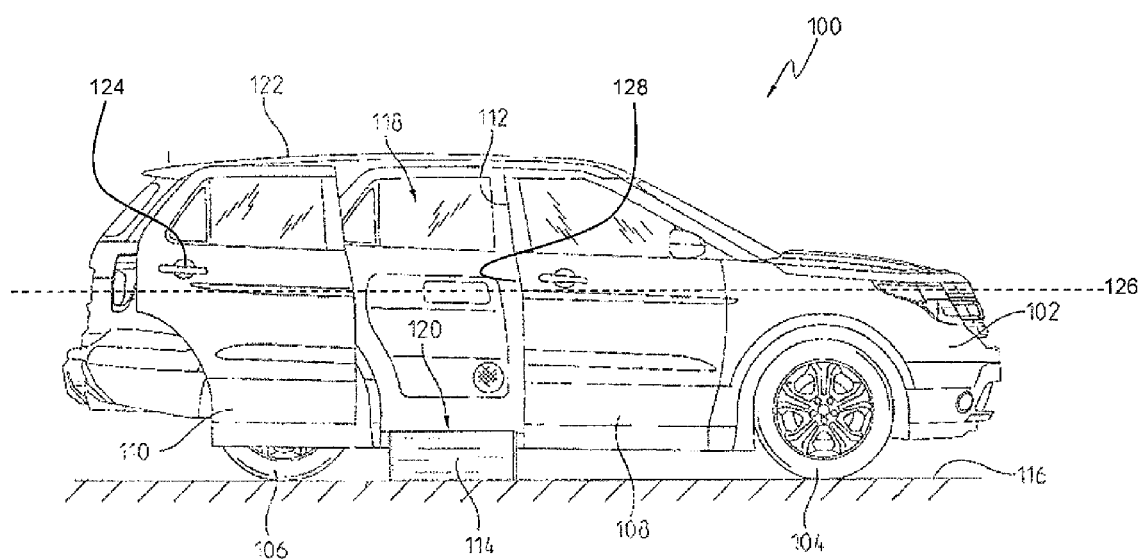
FIG. 1 illustrates an elevational side view of a motorized vehicle including an access ramp.

FIG. 1 illustrates an embodiment of a sport-utility vehicle (SUV) or crossover vehicle (CV) 100 available from any number of United States and foreign manufacturers. In one example, the vehicle is a Ford Explorer manufactured by Ford Motor Company. In the illustrated embodiment, the vehicle includes a unibody construction. Other SUVs or crossover vehicles contemplated within this disclosure may include a frame on body construction. Consequently the use of SUV herein includes all types and kinds of sport utility vehicles constructed with a body on frame construction, a unibody construction, or other constructions.

As shown in FIG. 1, the vehicle 100 may include a vehicle body 102 operatively coupled to front wheels 104 and rear wheels 106. The vehicle 100 includes a unibody construction and may be designed off of a truck chassis. The vehicle body 102 may also define a body axis 126 through the center of the vehicle 100. The body axis 126 may be defined along the length of the vehicle 100. The vehicle may be designed to have a gross vehicle weight of at least 6000 pounds. In another aspect, the rating may be at least 8000 pounds but less than approximately 10000 pounds. In a further aspect, the rating may be between approximately 6000 and 10000 pounds.

As shown, a first or front passenger side door 108 is located between the front wheels 104 and rear wheels 106 and provides access to a passenger for sitting in a front seat of the vehicle 100 adjacent to the driver. In this position, the passenger has a clearer forward view of the road when compared to sitting in a middle row or back row of seats of the vehicle 100.

The vehicle 100 of FIG. 1 has been modified to include a second passenger side door 110 coupled to the unibody frame through a door opening apparatus 200 (FIG. 2) and a latch 124. In a conventional vehicle such as a Ford Explorer, a passenger-side rear door is hingedly connected at two or more locations to a door frame of the vehicle so that in its open position the door is pivoted outwardly away from the vehicle about its hinges, as is understood by those skilled in the art. In this embodiment, however, the second passenger side door 110 is not hinged to a door frame, and in the open position of FIG. 1 the door 110 is disposed in a position approximately parallel with the body axis 126 of the vehicle 100. Unlike a minivan, however, the door 110 does not slide along tracks between its open and closed positions. Instead, in this embodiment the door 110 is coupled to the vehicle 100 via the door opening apparatus 200.

In addition to modifying the opening and closing of the door 110, an access opening 112 defined by a door frame of the vehicle 100 may be modified or widened to provide access to a passenger seated in a wheelchair. The opening 112 is defined on the sides thereof by a combination of a B pillar 128, a rear edge of the door 110, a vehicle floor 120, and a vehicle roof 122. The vehicle 100 may be further modified to include a ramp assembly 114 which provides rolling access of a wheelchair from a ground surface 116 into an interior 118 of the vehicle 100. The ramp assembly 114 is installed at the opening 112 and is movable between the interior 118 of the vehicle 100, where it is stored in some embodiments, and to the exterior for level change device deployment, wheelchair access, and ambulatory access. To accommodate the ramp assembly 114, the vehicle floor may be repositioned to a location that is at least an inch or more lower than a conventional floor of the vehicle.

Figure 2:
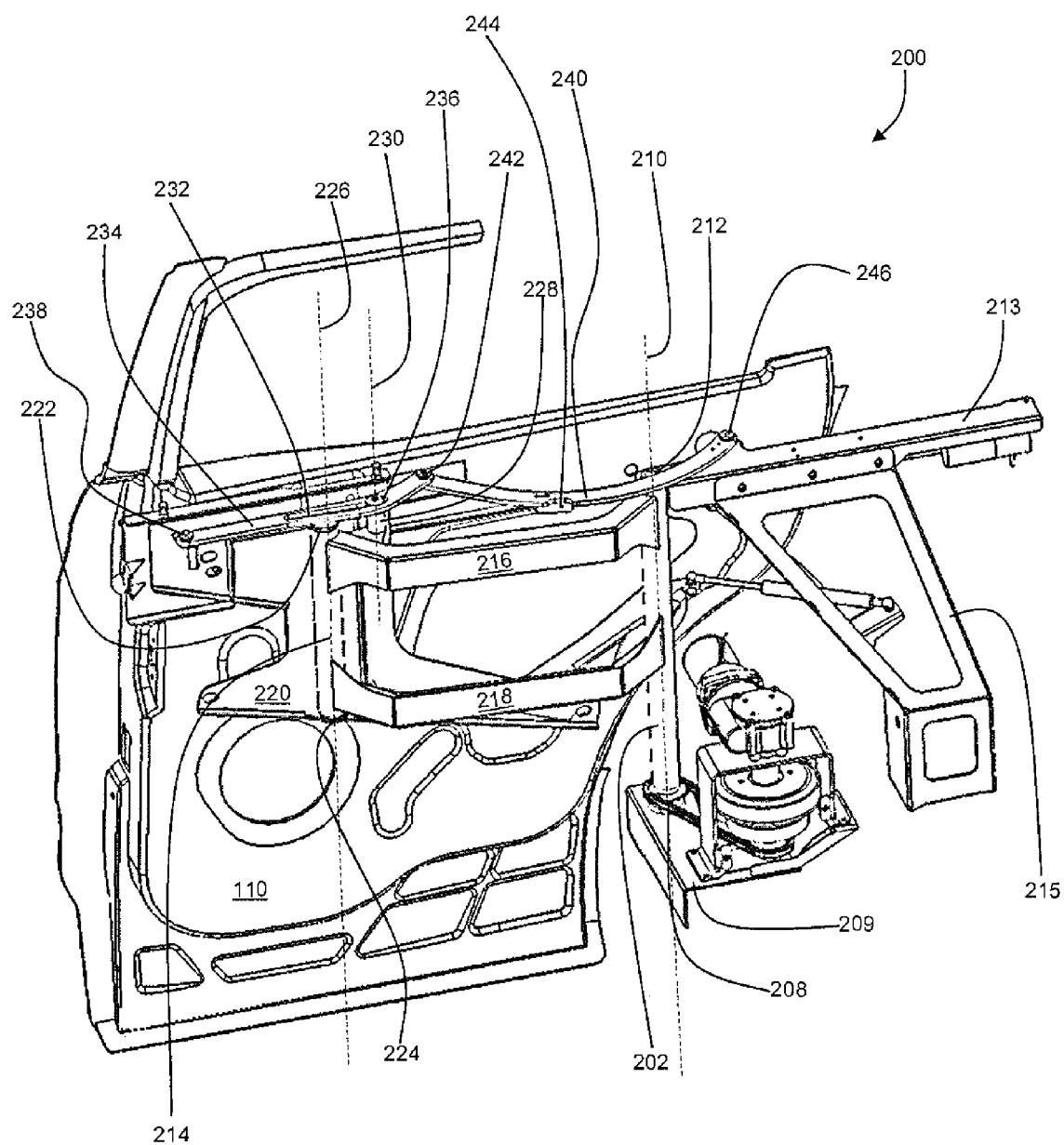
FIG. 2 illustrates an interior view of a door opening apparatus with the vehicle interior removed.

Referring now to FIG. 2, one embodiment of a vehicle door configured with an automatic door opening apparatus 200 is shown. More particularly, a first member 202 is shown. The first member 202 may be substantially cylindrical and can define a first axis 210. The first member 210 can be coupled to a portion of a base plate 209 at a first end 208. The first end 208 may further be pivotally coupled to the base plate 209 through a bearing (not shown). While this is not limited to any particular type of bearing, in one embodiment the bearing used at the first end 208 may be a thrust bearing or tapered cone bearing for providing both thrust and rotational control. The thrust bearing could be sufficient to withstand the axial load of the door 110 while simultaneously providing sufficient frictional properties to allow the first member 202 to pivot about a first axis 210. Further, while in one embodiment the first member 202 may be substantially cylindrical, one skilled in the art would understand that the first member 202 can be a plurality of shapes, including square, triangular, octagonal, or any other similar shape.

The first member 202 may also be coupled to a sub bracket 213 at a second end 212. The second end 212 may be rotationally coupled to the sub bracket 213 in a way that allows the first member 202 to rotate about the first axis 210. The sub bracket 213 may further be coupled to the vehicle body 102 through a support bracket 215. The support bracket 215 may be coupled to the vehicle body 102 by bolts, rivets, welds, adhesives, compression fittings, or the like. Further, the support bracket 215 may be coupled to the sub bracket 213 utilizing any of a plurality of known coupling methods.

Second end 212 may also utilize a thrust bearing (not shown) or tapered cone bearing to allow pivotally coupling the first member 202 along the first axis 210. The first end 208 and the second end 212 may be coupled in such a way that the first member 202 can pivot about the first axis 210 but be substantially restricted from any axial movement along the first axis 210. While one method of coupling the first member 202 to the vehicle body 102 has been described and shown herein, this disclosure is not limited to such an embodiment. One having skill in the relevant art will understand that there are many ways to pivotally couple the first member 202 to the vehicle body 102. For example, the first end 208 could be pivotally coupled directly to the vehicle body 102 and the second end 212 could be pivotally coupled to the vehicle body 102 through a single bracket.

In addition to the first member 202 a second member 214 may be utilized by the door opening apparatus 200. The second member 214 may be coupled to the first member 202 by a first and second cross member 216, 218. Further, the cross members 216, 218 may hold the first member 202 and the second member 214 in a substantially parallel configuration relative to one another. The cross members 216, 218 can be coupled to the first member 202 in such a way that the cross members 216, 218 pivot about the first axis 210 along with the first member 202. In one non-limiting embodiment, the cross members 216, 218 may be fixed to the first member 202 through welds, bolts, adhesives, clamps, and the like.

The cross members 216, 218 may be similarly fixed to the second member 214. The paths of rotation for the components of the door opening apparatus 500 are shown in FIG. 5a. The cross members 216, 218 can provide sufficient structural integrity to allow the first member 202 to rotate the second member 214 about a first arc 501 relative to the first axis 210. Further, the cross members 216, 218 may be spaced axially along the first member 202 and be substantially parallel to one another. This may result in a rigid coupling between the first member 202 and the second member 214 such that they do not substantially move relative to one another. In one embodiment, minimizing said axial movement may ensure that the door 110 consistently couples to the vehicle body 102 sufficiently when a closing routine is performed.

While the cross members 216, 218 have been described in detail above, other methods of coupling the first member 202 to the second member 214 could be used. This disclosure should not be limited to using the cross members 216, 218 described herein. In another non-limiting example, a substantially solid plate could be used to couple the first member 202 to the second member 214. Further, a single cross member, or more than two cross members could be utilized to achieve substantially the same result. One skilled in the art will understand that there are many ways to couple the first member 202 to the second member 214 and that it is advantageous to use the lightest coupling method available that supplies sufficient structural integrity to inhibit substantial deflection between the first member 202 and the second member 214.

The second member 214 may be pivotally coupled to a door coupler 220. The door coupler 220 may be pivotally coupled to the second member 214 at a first location 222 and a second location 224. Further, the first and second locations 222, 224 may be pivotally coupled to the door coupler 220 through a bearing or bushing (not shown) that allows the door coupler 220 to pivot about a second axis 226. The second axis 226 may be substantially parallel to, but offset from the first axis 210. Further, the door coupler 220 may be coupled to the second member 214 in a way that allows the door coupler 220 to rotate about the second axis 226. That is to say, the door coupler 220 may be oriented at a plurality of angles relative to the first and second cross members 216, 218.

The door coupler 220 can further be coupled to the door 110 in a plurality of different ways and using a plurality of different coupling methods. For instance, in one embodiment, the door coupler 220 can include a substantially planar plate that covers a large area of an internal portion of the door 110. The planar plate can be coupled to the interior portion of the vehicle door structure by bolts, welds, adhesives, rivets, and the like and this disclosure should not be limited to any one particular method.

Further, one skilled in the art will understand that the door coupler 220 may have a plurality of different shapes or cross-sections and should not be limited to a plate configuration. For example, reinforcement bars may couple the first and second locations 222, 224 to support structures of a vehicle door. Further, "L" brackets may couple the first and second locations 222, 224 directly to the door. The method used to couple the first and second locations 222, 224 to the vehicle door may vary depending on the material characteristics and strength of the components that form the door. One skilled in the art will understand that the particular method of coupling the vehicle door to the first and second locations 222, 224 will differ depending on the particular vehicle door the door opening apparatus 200 is being applied to.

Moreover, the door coupler 220 can be used to pivotally couple the door 110 to the second member 214. As described above, the door coupler 220 can pivot about the second axis 226 and further the cross members 216, 218 can move the second member 214 along the first arc 501 relative to the first axis 210. This may result in a door 110 that can change orientation about both the first axis 210 and the second axis 226.

The door coupler 220 may also be coupled to an orientation arm 234. The orientation arm 234 may partially control the angular orientation of the door coupler 220 relative to the first and second cross members 216, 218. The orientation arm 234 may be pivotally coupled to the door coupler 220 at a first end 238. First end 238 may be at a location along the door coupler 220 that is offset from the second axis 226. The orientation arm 234 may also have a coupling location at a second end 242. The orientation arm 234 may be configured to be pivotally coupled at both the first and second ends. The orientation arm 234 may also define a slotted portion 232 between first end 238 and second end 242. The slotted portion 232 may extend along a portion of the length of the orientation arm 234 and have a sufficiently wide opening to receive a portion of a guide 228.

In one embodiment, the orientation of the door coupler 220 relative to the body axis 126 can be controlled by the pivot points defined at the first end 238 and the second member 214. That is to say, as the first end 238 changes alignment with the second member relative to the body axis 126, the door coupler 220 and the door 110 also change angular alignment with the body axis 102.

The location of the first end 238 may be altered, in part, by the location of the second end 242. Second end 242 may be a pivotal location where the orientation arm 234 is pivotally coupled to a pivot arm 240. On a base end, the pivot arm 240 may be coupled to the sub bracket 213. Further, the pivot arm 240 may be pivotally coupled to both the orientation arm 234 and the sub bracket 213 by a bushing, bearing, or any other coupling mechanism that may allow a pivotal engagement between components. The pivot arm 240 and the orientation arm 234 may be substantially interconnected to one another to create a linkage between the door coupler 220 and the sub bracket 213.

As described in more detail above, the sub bracket 213 may be coupled to the vehicle body 102 through the support bracket 215 as shown in FIG. 2. In this configuration, the base end 246 may also be substantially coupled to the vehicle body 102 through the sub bracket 213. The pivotal coupling of the base end 246 to the sub bracket 213 may allow the pivot arm 240 to pivot to a plurality of angular orientations relative to the body axis 102.

The orientation arm 234 and the pivot arm 240 may also maintain substantially parallel planar alignment with one another. For example, both the orientation arm 234 and the pivot arm 240 may rotate within their respective parallel planes without substantially moving outside of said planar alignment. The orientation arm 234 and the pivot arm 240 are restricted to approximately two-dimensional movements within their respective parallel planes. More specifically, the orientation arm 234 and the pivot arm 240 may pivot about their respective pivot points, but may be substantially restricted from any axial movement about said pivot points.

Additionally, the pivot arm 240 may have a mount 244 coupled at a location between second end 242 and the base end 246. A stopper (not shown) can be coupled to the mount 244. The stopper may be configured to provide a dampened impact between the pivot arm 240 and a portion of the cross member 216 when the door 110 is in a fully opened position 510 (FIG. 5e). In one embodiment, the stopper coupled to the mount 244 may substantially restrict the door 110 from opening past the fully opened position 510 by restricting further rotation of the orientation arm 234 and the pivot arm 240.

One skilled in the art will understand the many ways to restrict the rotation of the pivot arm 240 and the orientation arm 234. In one non-limiting example the stopper could contact any portion of the orientation arm 234 and not a portion by the cross member 216. Further, the mount 244 and stopper may be located on the orientation arm 234 instead of the pivot arm 240. Lastly, a person having skill in the art will understand the plurality of materials and mechanisms that could be used to create the stopper. For example, the stopper may be made from an elastic or resilient material such as rubber, plastic, or the like. Further, the stopper may include a mechanical dampening device such as a hydraulic cylinder, a metal or gas spring, or any other mechanical dampening device.

The base end 246 may also have a position sensor (not shown) located thereon. The position sensor may be utilized to measure the position of the pivot arm 240. In one embodiment, using the position sensor to determine the position of the pivot arm 240 may be used to determine the position of the door 110. For example, if the position sensor reads the pivot arm 240 to be in one location, it may be an indication that the door 110 is in a closed position 502 (FIG. 5b). Further, when the position sensor reads that the pivot arm 240 is in a different location, it may be an indication that the door 110 is not in the closed position 502.

In one embodiment the position sensor may be an absolute sensor. The absolute sensor can determine the orientation of the door 110 in any configuration. The type and location of the sensor is not limited however. There may be other types of sensors and sensor locations that may be used to determine the configuration of the door. For instance, a sensor may be placed on the first member 202, the second member 214, or any other location that experiences movement when the door 104 changes angular orientation relative to the body axis 126. Further, the door sensor that is commonly manufactured in a vehicle may be utilized to determine when the door is in the fully closed configuration.

In FIG. 2, the guide 228 may be coupled to the first cross member 216. The guide 228 may be a substantially cylindrical protrusion from a surface portion of the first cross member 216. Further, the guide 228 may define a third axis 230 that is parallel to, but offset from, the first and second axes 210, 226. The guide 228 may be sized to be received at least partially by the slotted portion 232 of the orientation arm 234. The guide 228 may have a first diameter and a second diameter (not shown). The first diameter may be greater than the second diameter and greater than a width of the slotted portion 232. Further, the second diameter may be less than the width of the slotted portion 232. In one embodiment, at least a portion of the second diameter of the guide 228 may be disposed within the slotted portion 232 of the orientation arm 234. In such a configuration, a cap 236 may be coupled to a distal portion of the guide 228.

The cap 236 may force the guide 228 to remain at least partially disposed within the slotted portion 232 of the orientation arm 234. In one non-limiting embodiment, this may be achieved by utilizing the cap 236 and the first and second diameter of the guide 228 to create a radial channel about the guide 228 that fits within the slotted portion 232 of the orientation arm 234. The guide 228 may then slide freely along the slotted portion 232 while being restricted from moving axially away from the orientation arm 234 in either axial direction along the third axis 230.

The orientation arm 234 may be slidably coupled to the guide 228 at the slotted portion 232 in addition to being pivotally coupled to the door coupler 220 and the pivot arm 240 as described in detail above. As the door 104 transitions between the fully opened position 510 (FIG. 5e) and the fully closed position 502 (FIG. 5b), the orientation of the door 110 may be partially defined by the alignment of the guide 228 in the slotted portion 232. More specifically, because the orientation of the door 104 depends on the alignment of first end 238 and the second member 214 as described above, the position of the guide 228 in the slotted portion 232 may alter the location of the first end 238 and in turn, the angle of the door 104 relative to the body axis 126. For example, as the second member 214 is moved along the first arc 501, the orientation arm 234 may change the position of the first end 238 as the guide 228 slides about the slotted portion 232.

The guide 228 may slide about the slotted portion 232 because of the pivotal coupling locations of the orientation arm 234, the pivot arm 240, and the first member 202. The first arc 501 and the second arc 512 show the path of the second member 214 and second end 242 as they pivot between the fully closed position 502 and the fully opened position 510. More specifically, because the pivot point of both arcs 501, 512 are coupled to the vehicle body 102, and because second end 242 and the second member 214 are substantially rigid members between their respective outer points and pivot points, both second end 242 and the second member 214 are substantially restricted to their respective arcs 501, 512 as the door moves between the fully closed position 502 and the fully opened position 510.

Considering this restricted relationship, the slotted portion 232 of the orientation arm 234 provides for a way to pivotally couple second end 242 to the second member 214. More specifically, as second end 242 and the second member 214 travel about their respective arcs 501, 512, the orientation arm 234 may pivot the door coupler 220, as the guide slides through the slotted portion 232. In this configuration, the profile of the slotted portion 232 and the location of second end 242 and the second member 214 about their respective arcs 501, 512, may substantially dictate the angular orientation of the door 104 relative to the body axis 126.

Figure 3:
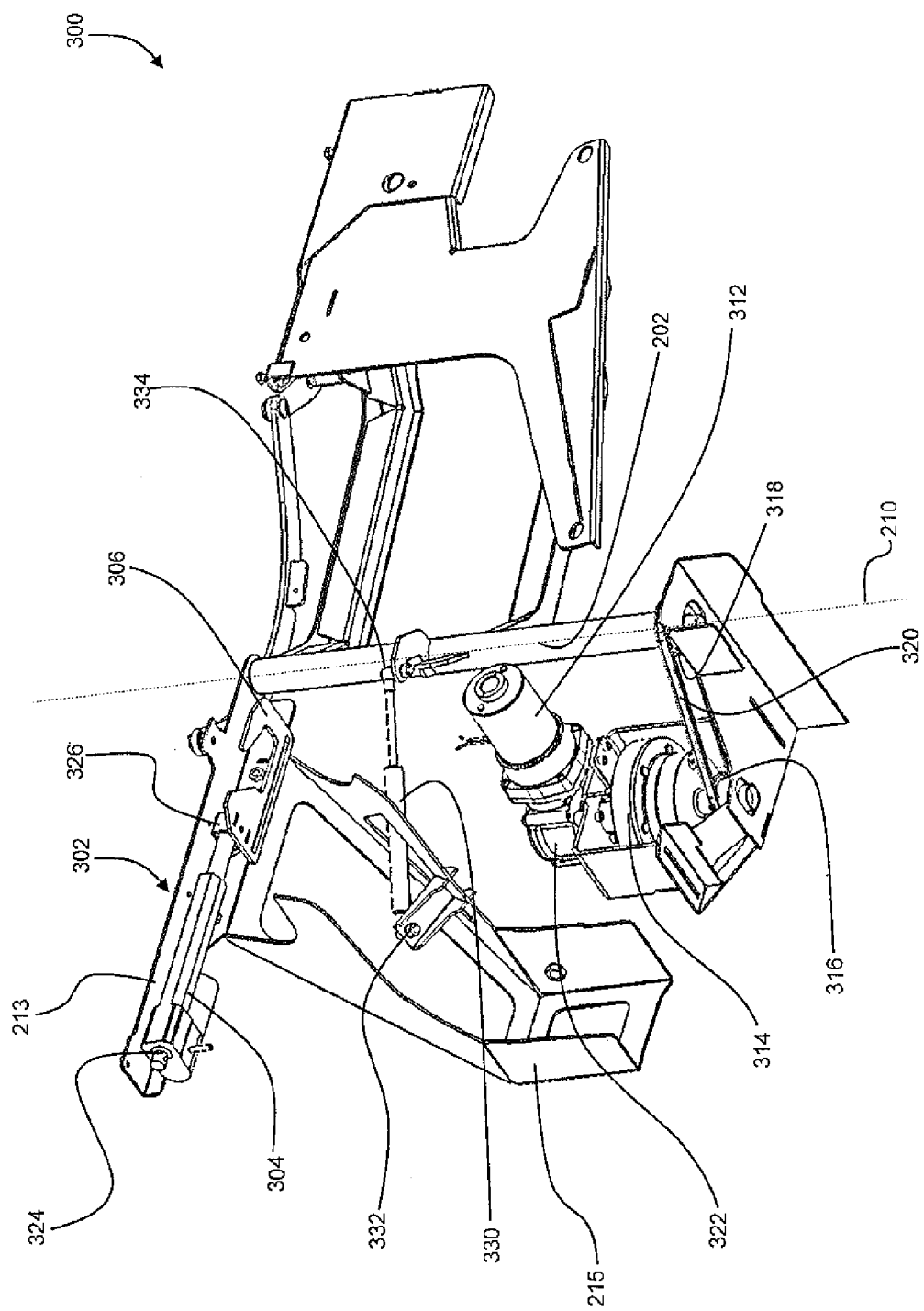
FIG. 3 illustrates an exterior perspective view of the door opening apparatus of FIG. 2 with the vehicle door removed.
Figure 6:
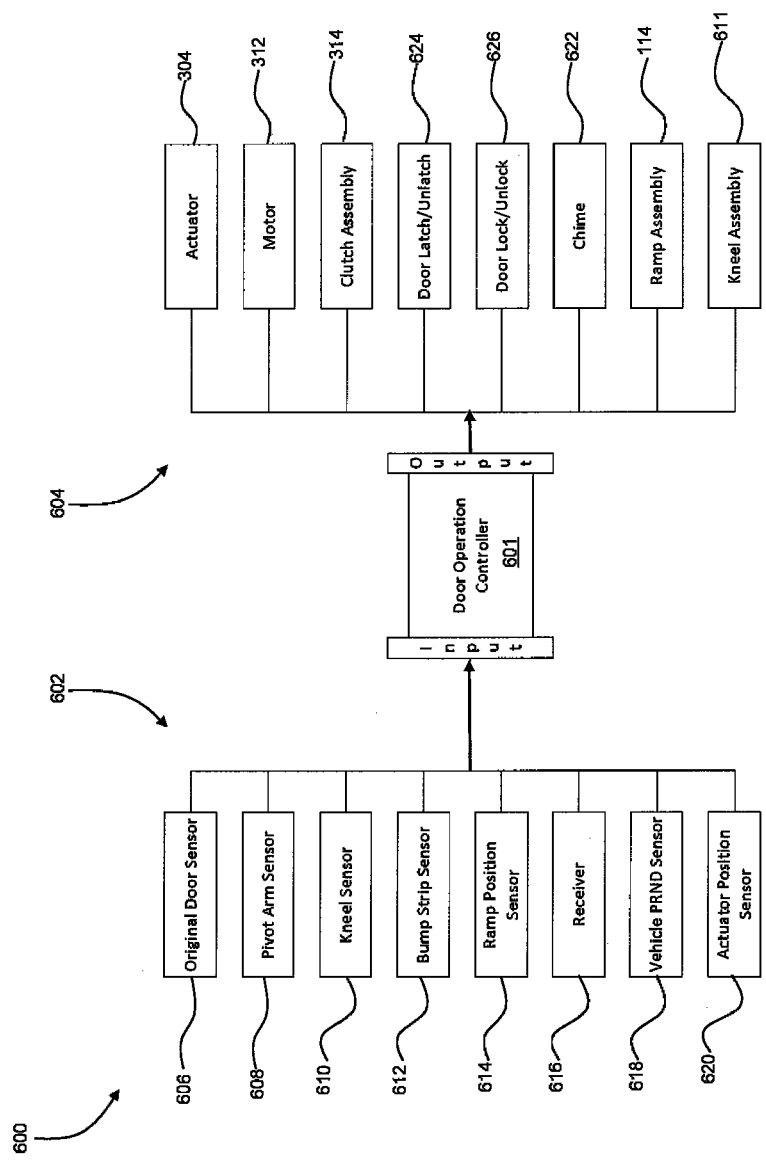
FIG. 6 illustrates a block diagram of one embodiment of the control system for the door opening apparatus of FIG. 2.

One aspect of the present disclosure is the ability of the door operation to be completed without substantial user intervention. For example, the user may operably control the door 110 from a fully closed position 502 (FIG. 5b) to the fully opened position 510 (FIG. 5e) by only sending an electrical signal to a controller 601 (FIG. 6). This may be achieved by incorporating a drive mechanism 312, a clutch assembly 314, a first and second sprocket 316, 318, and a drive chain 320 as shown in FIG. 3.

In one embodiment, the drive mechanism 312 may be electrically powered and coupled to a power source (not shown) through the controller 601. The mechanical output of the drive mechanism 312 may further be coupled to a gear set 322 where the torque and speed of the drive mechanism 312 can be controlled to meet the needs of the door operation. The output of the gear set 322 may further be coupled to the clutch assembly 314. The clutch assembly 314 may be capable of both an engaged position and a disengaged position. In the disengaged position, the drive mechanism 312 may not be mechanically coupled to the first sprocket 316. However, in the engaged position, the clutch assembly 314 may transfer the torsional forces generated by the drive mechanism 312 to the first sprocket 316.

The first sprocket 316 may transfer torsional loads from the drive mechanism 312 to the second sprocket 318 via the drive chain 320. In other embodiments, a gearset, belt, timing belt, and the like may be used with or in place of the drive chain 320. The second sprocket 318 may be coupled to the first member 202 in such a way that allows the first member 202 to rotate as the second sprocket 318 rotates. That is to say, the drive mechanism 312 may provide torsional power to rotate the first member 202 through the drive chain 320 and first and second sprockets 316, 318 when the clutch assembly 314 is in the engaged position. As described above, the cross members 216, 218 may further transfer the rotation of the first member 202 to the second member 214 and cause the second member 214 to move along the first arc 501.

When the door 110 is not latched to the vehicle body 102, the door 110 can be rotated from the closed position 502 to the fully opened position 510 by the drive mechanism 312. More specifically, the door opening apparatus 200 can control both the angle of the door 110 relative to the body axis 126 and the location of the second member 214 along the first arc 501.

Some of the structural components of the door 500 are shown in FIGS. 5a-5e. The embodiments shown in FIGS. 5a-5e include top side views of the door opening apparatus 200 in the fully opened position 510 in FIG. 5e, a halfway opened position 506 in FIG. 5d, a partially closed position 504 in FIG. 5c, and the fully closed position 502 in FIG. 5b.

In the fully closed position 502, the guide 228 is in the slotted portion 232 in an area proximate to the second end 242. In the fully closed position 502, the orientation arm 234 may align first end 238 with the second member 214 so that the door 110 is substantially aligned with the vehicle body 102. In one embodiment, when the angle of the orientation arm 234 is changed by the position of the guide 228, the angular orientation of the door coupler 220 will also change relative to the body axis 126.

Second end 242 may travel along the second arc 512 as the second member 214 rotates due to the manner in which the orientation arm 234 is coupled to the door coupler 220. As described above, first end 238 and the guide 228 can define the angular orientation of the door coupler 220 relative to the vehicle body 102. Further, second end 242 may be forced to travel along the second arc 512 by the pivot arm 240. As the second member 214 is pivoted about the first arc 501, second end 242 is pivoted about the second arc 512 by the orientation arm 234. While second end 242 is pivoted about the second arc 512, the angle of the orientation arm 234 changes relative to the pivot arm 240 and in turn the angle of the door 104 is changed relative to the body axis 126. In one embodiment, the drive mechanism 312 may provide the torsional force to pivot the door opening apparatus 200 as described above.

The drive mechanism 312 may be used to alter the location of first end 238 and in turn the specific angular orientation of the door coupler 220 about the second axis 226. For example, in the fully closed position 502, first end 238 may be aligned with the second axis 226 such that the door coupler 220 will substantially align the door 110 with the vehicle body 102. However, as the drive mechanism 312 moves the second member 214 about the first arc 501, the angular alignment of first end 238 and the second member 214 relative to the vehicle body 102 may be forced to change because of the orientation of the pivot arm 140 and the orientation arm 134.

The guide 228 may slide through the slotted portion 232 to change angular orientations of the door coupler 220 as the drive mechanism 312 rotates the door opening apparatus 200 between the fully closed position 502 and the fully opened position 510. In other words, because the second member 214 and second end 242 may be constrained to travel along their respective arcs 501, 512 and as the drive mechanism 312 rotates the second member 214, the orientation arm 234 may alter the orientation of the door coupler 220 as the guide 228 slides through the slotted portion 232.

The location of the guide 228 and the profile of the slotted portion 232 may also define the angular orientation of the orientation arm 234. As described above, the guide 228 may be coupled at a location along the first cross member 216 between the second member 214 and the first member 202. When the door opening apparatus 200 is in the fully closed position 502 as shown in FIG. 5b, the guide 228 may be in the proximal part of the slotted portion 232 relative to second end 242. As the door opening apparatus 200 transitions to the partially closed position 504, the guide 228 may slide along the slotted portion 232 until the guide 228 is located in an approximately centered position along the slotted portion 232. Finally, when the door reaches the fully opened position 510, the guide 228 may be located at a substantially distal portion of the slotted portion 232 from second end 242.

The slotted portion 232 may be designed to interact with the guide 228 to manipulate the door 110 orientation depending on the door 110 position. More particularly, the slotted portion 232 and the relationship between the slotted portion 232 and the orientation arm 234 is shown FIGS. 5a-5e. The slotted portion 232 may have an arc-shaped or curved profile as one way the orientation of the door 110 may be changed as the guide 228 slides therealong. In one embodiment altering the profile of the slotted portion 232 may be advantageous because it may allow the angular orientation of the door 110 relative to the body axis 126 to change between the fully closed position 502 and the partially closed position 504. For example, a bend (not shown) at the distal location of the slotted portion 232 relative to the second end 242 may cause the angular orientation of the door 110 relative to the vehicle body 102 to change between the fully closed position 502 and the partially closed position 504. Such a bend may assist the door 110 latch in exiting the engaged position as the door transitions from the fully closed position 502 to the partially closed position 504.

A cinch assembly 302 is more clearly shown in FIG. 3 and how the cinch assembly 302 couples to the sub bracket 213. The cinch assembly 302 may include an actuator 304 that may be coupled to the sub bracket 213 at a first side 324, and to a cinching head 306 at a second side 326. The actuator 304 may be substantially fixed to the sub bracket 213 at the first side 324, but capable of moving the cinching head 306 to at least a push position 450 shown in FIG. 4b, a neutral position 460 shown in FIG. 4c, and a latch position 470 shown in FIG. 4d.

Figure 4A:
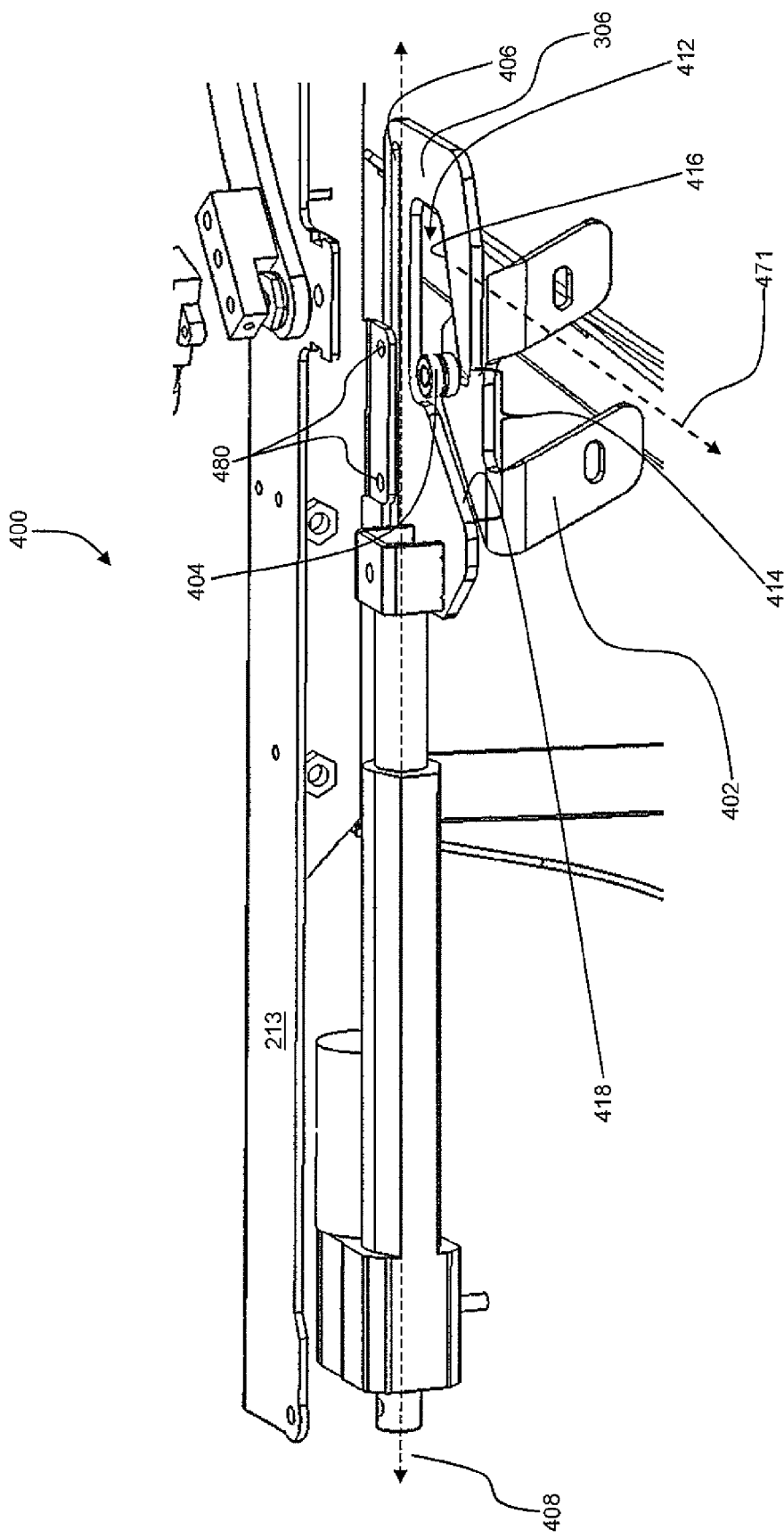
FIG. 4a illustrates a side perspective view of a cinching mechanism of the door opening apparatus of FIG. 2 with the door removed.

A more detailed view of the cinching head 400 is shown in FIG. 4a. The cinching head 306 can define an inner cavity 412. The inner cavity 412 can have an opening 414 configured to allow a door bracket guide 404 to transition into, and out of, the inner cavity 412. The door bracket guide 404 can be coupled to a door bracket 402 at a location that allows the door bracket guide 404 to become disposed within the inner cavity 412. The door bracket 402 may further couple the door bracket guide 404 to the door 110. In one embodiment, the door bracket guide 404 may be a substantially cylindrical protrusion extending from a surface of the door bracket 402. In a different embodiment, the door bracket guide 404 may include a roller or bearing at the location that aligns with the cinching head 306.

The cinching head 306 may also have a first slanted portion 416 and a second slanted portion 418. Both the first slanted portion 416 and the second slanted portion 418 may be configured to engage the door bracket guide 404. For example, when the cinch assembly 302 is oriented in the push position 450, the first slanted portion 416 may contact the door bracket guide 404 and force a door bracket 402 in an exterior direction 471 away from the vehicle body 102. Similarly, when the cinch assembly 302 is oriented in the latch position 470, the second slanted portion 418 may contact the door bracket guide 404 and bring the door bracket 402 in an interior direction 472 towards the vehicle body 102. Finally, when the cinch assembly 302 is oriented in the neutral position 460. The door bracket guide 404 may transition from being within the inner cavity 412 of the cinching head 306 to a position outside of the cinching head 306 without engaging the actuator 304.

The cinching head 306 may have a slotted support region 406. The slotted support region 406 may extend parallel to a slide axis 408 defined by actuator 304. The slotted support region 406 may also be slideably coupled to the sub bracket 213. In one embodiment, this may be done by couplers 480 extending through the slotted support region 406 and into the sub bracket 213. The couplers 480 may have a body portion that can be encompassed by the slotted support region 406 and a head portion that is wider than the slotted support region 406. The couplers 480 may also be sufficiently spaced along the sub bracket 213 to allow the cinching head 306 to slide between the push position 450 and the latch position 470 without substantially inhibiting the axial movement of the cinching head 306 along the slide axis 408.

In one embodiment the slotted support region 406 and the couplers 480 may allow the cinching head 306 to pull the door 110 in the interior direction 472 while in the latch position 470 without substantially deflecting the actuator 304 in the exterior direction 471. That is to say, the actuator 304 can move the cinching head 306 along a slide axis 408, while the slotted support region 406 can resist forces generated in the exterior direction 471 by slidably coupling the cinching head 306 to the sub bracket 213.

As is known in the art, vehicle doors may have a fully latched position and a partially latched position. In one embodiment, the cinch assembly 302 may be configured to supply a supplemental force to transition the door from, the partially latched position to the fully latched position.

The cinch assembly 302 may influence the orientation of the door 110 through the door bracket guide 404 coupled to the door bracket 402. One way this may be achieved is by transitioning the cinch assembly 302 from the neutral position 460 to the latch position 470 only when the door 110 is in the partially latched position. As the cinching head 306 is moved along the slide axis 408 towards the first side 324, the first slanted portion 416 may contact the door bracket guide 404 and pull the door 110 in an interior direction 472 to the fully latched position. After the cinch assembly 302 has pulled the door 110 to the fully latched position, the cinch assembly 302 may return to the neutral position 460 where the door bracket guide 404 may be substantially disposed within the opening 414.

The cinch assembly 302 may also provide a supplemental opening force when something is inhibiting the door 110 from transitioning to the fully opened position 510. In one non-limiting example, snow or ice may accumulate along seals between the door 110 and the vehicle body 102. In these conditions, the cinch assembly 302 may provide a supplemental opening force. In one embodiment, the door bracket guide 404 may be at least partially located within the inner cavity 412 of the cinching head 306. The actuator 304 may move the cinching head 306 away from the first side 324 along the slide axis 408 so that the second slanted portion 418 contacts the door bracket guide 404. As the actuator 304 moves the second slanted portion 418 further away from the first side 324, the door 110 is forced in the exterior direction 471 towards the fully opened position 510. The supplemental force produced by the cinch assembly 302 may be sufficient to break the seals of the door 104 free of any restrictions and allow the drive mechanism 312 to move the door 104 to the fully opened position 510.

The cinch assembly 302 may remain in the neutral position 460 unless the cinch assembly 302 is directed to transition to either the latch position 470 or the push position 450. While in the neutral position 460, the door bracket guide 404 may transition in to, or out of, the inner cavity 412 of the cinching head 306. This configuration may allow the door 110 to transition from a closed state to an open state (or vice versa) without the door bracket guide 404 substantially contacting the cinching head 306. While the cinching head 306 is in the neutral position 460, the door 110 may be manipulated by either a user or a door operation function without being restricted by the cinching head 306.

One skilled in the art will understand how the slotted support region 406 and couplers 480 can provide supplemental support to the cinching head 306 during both the push position 450 and the latch position 470. During the push position 450, as the actuator 304 moves the cinching head 306 away from the first side 324, the door bracket guide 404 contacts the second slanted portion 418. If the door 110 does not open, the cinching head 306 will experience a force in the interior direction 472. The couplers 480 located within the slotted support region 406 may substantially counter the force in the interior direction 472 because the couplers 480 are slidably coupled to the vehicle body 102 through the sub bracket 213. As described above, the relationship between the slotted support region 406 and the couplers 480 allows the cinching head 306 to move along the slide axis 408 but substantially restricts movement in the interior direction 472.

The slotted support region 406 and the couplers 480 can also substantially restrict forces in the exterior direction 471 when the cinching head 306 is transitioning towards the latch position 470. Forces in the exterior direction 471 may be experienced by the cinching head 306 when the door 110 resists further movement in the interior direction 472. The slotted support region 406 and the couplers 480 may provide the necessary supplemental support to substantially restrict the cinching head 306 from moving in the exterior direction 471.

One skilled in the art will understand the plurality of ways the cinching head 306 can be restricted from substantially deflecting outside of the slide axis 408. For example, instead of a slotted portion and couplers, the cinching head 306 may have rails that only allow the cinching head 306 to move along the desired path. Further, there are a plurality of different types of linear bearings that can be utilized with the cinching head 306 to address the forces described above, any of which could similarly be implemented under this disclosure.

Figure 11:
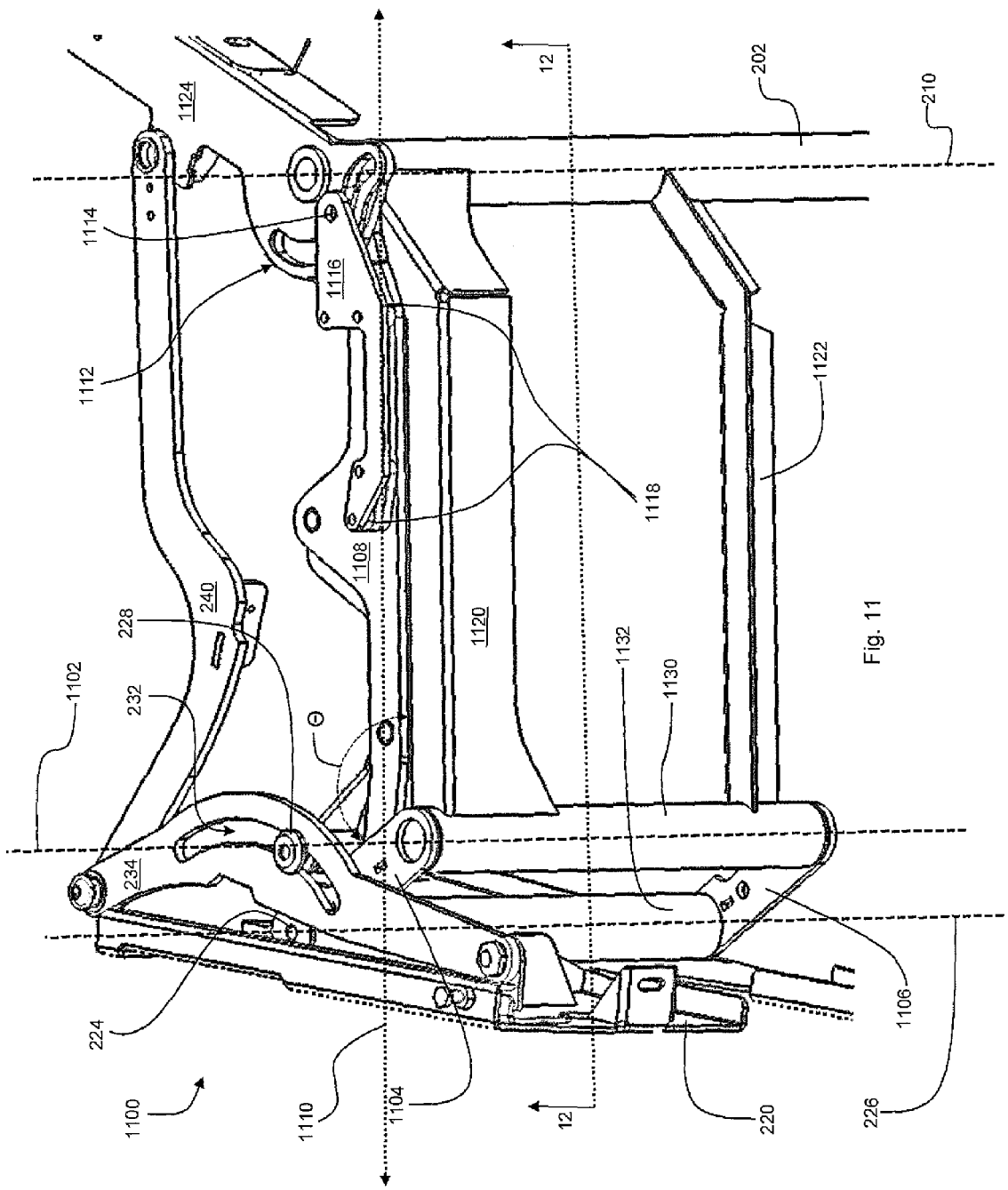
FIG. 11 illustrates a perspective partial view of another embodiment of the door opening apparatus with the motor vehicle and vehicle door removed.

In a different embodiment 1100 shown in FIG. 11, there may be a fourth axis 1102 between the first member 202 and the second location 224. The fourth axis 1102 may be defined by a first support member 1130. The fourth axis 1102 may define a rotational axis for a first and second connecting arms 1104, 1106. More particularly, the first and second connecting arm 1104, 1106 may pivot about the fourth axis 1102 to change the angular orientation of the first and second connecting arms 1104, 1106 relative to cross members 1120, 1122. The first and second connecting arms 1120, 1122 may pivotally couple the first support member 1130 to a second support member 1132. The particular angle between the first and second connecting arm 1104, 1106 and the cross members 1120, 1122 is shown by angle $\Theta$.

An angle arm 1108 may be slideably coupled to the first cross member 1120. The angle arm 1108 may be restricted from any substantial movement outside of sliding axially about a linear axis 1110 defined along the first cross member

1120. The axial location of the angle arm 1108 along the linear axis 1110 may be controlled by a slotted profile 1112 defined by a portion of the support sub bracket 1124. A control end 1114 of the angle arm 1108 may provide a means for slidably coupling the angle arm 1108 to the slotted profile 1112. The control end 1114 may have a retention member 1116 coupled to the angle arm 1108 via at least one spacer 1118 and a roller or pin (not shown).

The retention member 1116 may be disposed so that a bottom surface of the retention member 1116 is substantially aligned with an upper surface of the slotted profile 1112 of the sub bracket 1124. Further, an upper surface of the angle arm 1108 may be substantially aligned with a lower surface of the slotted profile 1112 of the sub bracket 1124. In one non-limiting example, the spacer 1118 is substantially the same thickness as the portion of the sub bracket 213 that defines the slotted profile 1112. The angle arm 1108 and the retention member 1116 may partially encompass the slotted profile 1112. The roller or pin may couple the retention member 1116 to the angle arm 1108 while passing through a portion of the slotted profile 1112.

The engagement between the retention member 1116, the angle arm 1108, the roller or pin, and the slotted profile 1112 is such that the slotted profile 1112 can move relative to the angle arm 1108. More specifically, the angle arm 1108 may rotate about the first axis 210 while the pin or roller follows the slotted profile 1112. As the slotted profile 1112 changes relative to the first axis 210, the angle arm 1108 may change axial location along the linear axis 1110.

Figure 12:
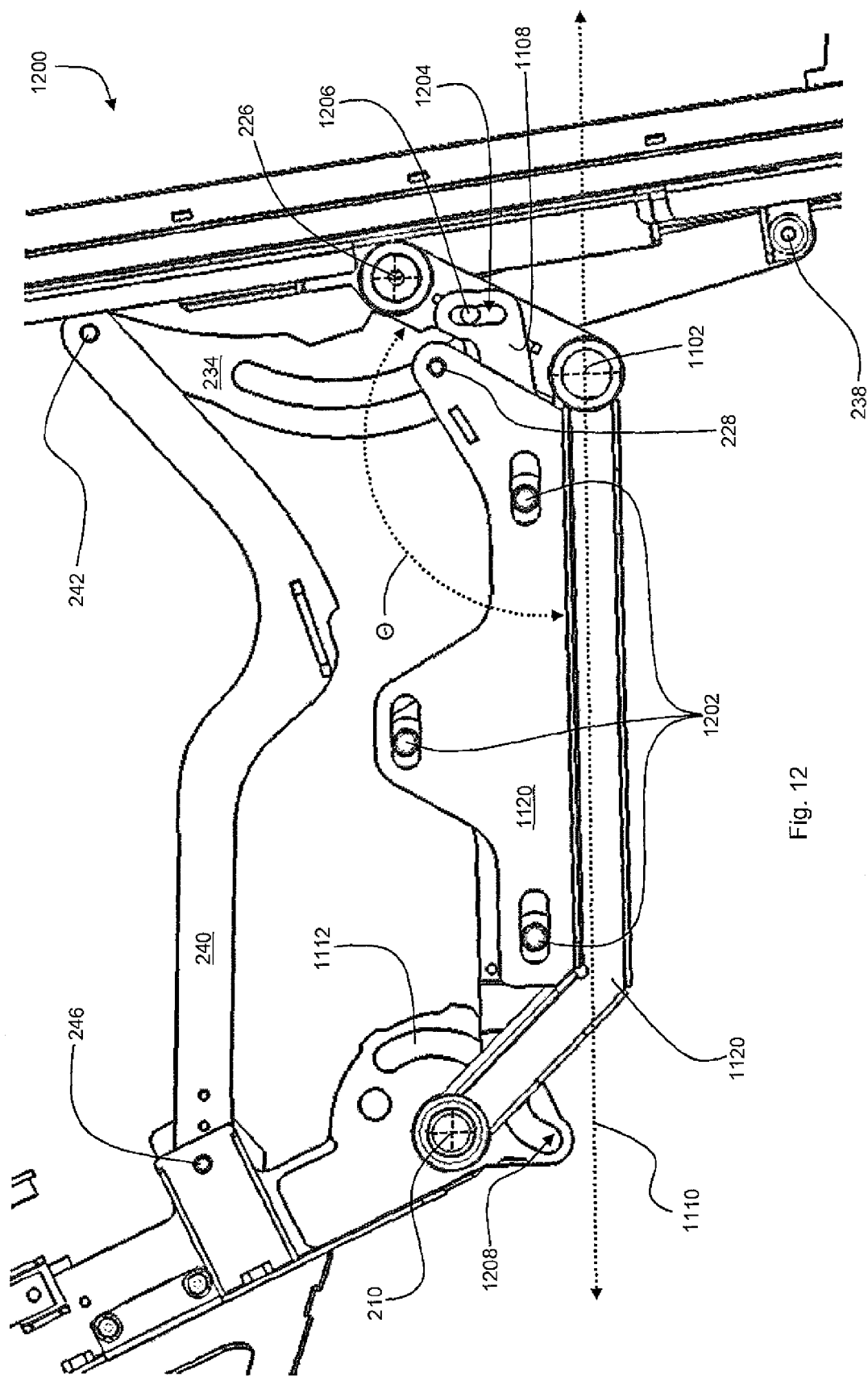
FIG. 12 illustrates a partial bottom-side perspective view of the door opening apparatus of FIG. 11.

At least one slider coupler or slot 1202 is shown in a bottom-side perspective view 1200 of the door opening apparatus shown in FIG. 12. The slider coupler 1202 may be a defined opening in the first cross member 1120 that allows for the angle arm 1108 to move in an axial direction along the linear axis 1110 while being slidably coupled to the first cross member 1120. In one embodiment, the angle arm 1108 may have a slider bearing or pin disposed within the slider coupler 1202. The slider bearings may substantially restrict the angle arm 1108 from any movement other than the axial movement along the linear axis 1110. The slider coupler 1202 may define a maximum and minimum axial distance that the angle arm 1108 can move relative to the first axis 210. In the illustrated embodiment of FIG. 12, the first cross member 1120 may include a plurality of slider couplers or slots 1202, and the angle arm 1108 may include an equal number of slider bearings or pins for slidably engaging each slot.

The angle Θ may be altered by changing the linear distance between the angle arm 1108 and the first axis 210. The angle arm 1108 may define a slotted coupling 1204 at a location substantially adjacent to the first connecting arm 1104. The slotted coupling 1204 may be pivotally and slidably coupled to the first connecting arm 1104 by a slider 1206. As the angle arm 1108 moves about the linear axis 1110, the slotted coupling 1204 may alter the angle Θ as the slider 1206 forces the first connecting arm 1104 to rotate about the fourth axis 1102. The angle Θ is determined by the location of the pin or roller within the slotted profile 1112 because the angle arm 1108 will move the slider 1206 as the pin or roller moves within the slotted profile 1112. For example, if the angle arm 1108 is slid away from the first axis 210 by the slotted profile 1112, the angle Θ will become larger as the first connecting arm 1104 is forced to rotate about the fourth axis 1102 away from the first axis 210 by the angle arm 1108.

In one embodiment, the slotted profile 1112 may have a taper 1208 at one end. The taper 1208 may extend radially away from the first axis 210 and be followed by the pin or roller of the angle arm 1108 as the door 110 approaches the fully closed position 502. In this embodiment, the taper 1208 may cause the angle Θ to change as the door 110 moves from the partially closed position 504 to the fully closed position 502. The taper 1208 may allow an initial angular rotation of the door 104 relative to the body axis 126 that is sufficient to allow the door 110 to properly transition between a fully closed position 502 and a fully opened position 510.

In the embodiment with the fourth axis 1100, the door 110 may be rotated about the first axis 210 in substantially the same way as described above. As the first cross member 1120 rotates about the first axis 210, the linear location of the angle arm 1108 along the first cross member 1120 may be altered by the location of the pin or roller and the slotted profile 1112. As the linear location of the angle arm 1108 changes, so does the angle Θ and in turn the door 110. Simultaneously with the change of the angle Θ, the pivot arm 240 may rotate about the base end 246. As the pivot arm 240 rotates, the position of the orientation arm 234 also changes based on the location of second end 242, the guide 228, and first end 238. That is to say, as the angle arm 1108 can change angle Θ as the door moves between positions, the pivot arm 240, the orientation arm 234 and the guide 228 can also change the angular orientation of the door 110 relative to the vehicle body 102 in substantially the same way as described in the previous embodiments.

The features disclosed herein may be implemented in a plurality of ways. For instance, the particular location of the guide 228 and the size and orientation of the slotted portion 232 may change without deviating from the teachings of this disclosure. Further still, using a roller and a track, or any other similar means of slidably engaging a structure, are considered to be potential substitutes for the slots, bushings, or rollers disclosed herein. Accordingly, this application is not limited to any one configuration.

Yet another aspect of the present disclosure is the location of the clutch assembly 314 between the drive mechanism 312 and the first sprocket 316. The clutch assembly 314 may be electronically controlled by the controller 601. Further, the clutch assembly 314 can at least partially control whether the door 110 is opened by the drive mechanism 312 or by a user manipulating the door latch 124. For example, when the clutch assembly 314 is in the disengaged position, the door 110 can be opened from the fully closed position 502, to the fully opened position 510, without engaging the drive mechanism 312. By disengaging the clutch assembly 314, the first sprocket 316 may rotate the second sprocket 318 with the drive chain 320 without requiring the drive mechanism 312 to rotate. In this embodiment, the user may open the door 110 without requiring the drive mechanism 312 to rotate as the door 110 transitions from the fully closed position 502 to the fully opened position 510.

The door 110 may transition from the fully closed position 502 to the fully opened position 510 in substantially the same way it would when the drive mechanism 312 is powering the door opening apparatus 200. For example, when the door is opened by a user, the second member 214 may travel along the first arc 501 and the second end 242 may travel along the second arc 512 in the same manner as if the door 110 were being opened by the drive mechanism 312. Further, the slotted portion 232 may still interact with the guide 228 to substantially control the angular orientation of the door 110 relative to the vehicle body 102. That, is to say, the mechanical components that substantially control the path of travel of the door 110 relative to the vehicle body 102 may be affective whether powered by the drive mechanism 312 or a user.

Once the door 110 becomes disposed in either the fully closed position 502 or the fully opened position 510, whether by a user or the drive mechanism 312, a spring 330 (FIG. 3) may be utilized to assist in maintaining the door 110 in the desired position. The spring 330 may be coupled to a portion of the support bracket 215 at a first end 332 and a part of the first member 202 at a second end 334. The spring 330 may be a compression spring that applies a force to separate first end 332 and second end 334. Second end 334 may be coupled to the first member 202 so that it is radially offset from the first axis 210. Moreover, when the door 110 is in the fully closed position 502, second end 334 of the spring 330 may provide a torsional force about the first axis 210 to hold the door 110 in the fully closed position 502. Further, as the door 110 moves from the fully closed position 502 to the fully opened position 510, second end 334 may rotate sufficiently about the first axis 210 to provide a torsional force about the first axis 210 to hold the door 110 in the fully opened position 510.

In one embodiment, the torsional force supplied by the spring 330 to the first member 202 may maintain the door in the fully opened position 510 or the fully closed position 502 when the clutch assembly 314 is disengaged. However, the torsional force supplied by the spring 330 may not be sufficiently strong to stop the clutch assembly 314 and drive mechanism 312 from transitioning the door 110 between fully opened position 510 and the fully closed position 502. That is to say, the spring 330 may be capable of maintaining the position of the door 110 when the clutch assembly 314 is disengaged, but the spring 330 may not be strong enough to keep the clutch assembly 314 and drive mechanism 312 from changing the position of the door 110. This may be referred to as an "over-center" mechanism.

One skilled in the art will also understand that a plurality of springing mechanisms may be used for the spring 330. A coil spring, gas spring, leaf spring, and the like may be used to form the spring 330. Further, other methods of mechanically holding the door 110 in the open or closed position are considered herein. One such method may include electrically locking the drive mechanism 312 and the clutch assembly 314 to substantially restrict further movement of the door 104. One skilled in the art will understand that other known methods for holding a vehicle door open can be used. For example, a cam and roller assembly may be used. The cam may be coupled to the second end 334 of the support bracket 215 and include indentations which the rollers may become partially disposed in when the door 110 reaches the fully opened position 510 or the fully closed position 502. Accordingly, this disclosure is not limited to any one particular method.

One aspect of the present disclosure is the ability of the door 110 to transition from the fully closed position 502 to the fully opened position 510 without substantial user interaction while still maintaining traditional functionality of the door 110 handle and latch 124. In one example, the vehicle 124 may be substantially unaltered with the exception of adding a latch solenoid (not shown), or any other similar mechanism, to electronically move the latch 124 from a latched position to an unlatched position.

The solenoid may be located within a cavity of the door 110 and may be oriented about the latch 124 in a manner that allows the latch solenoid to transition the latch to the unlatched position. The latch solenoid may be electrically powered and controlled through the controller 601. However, the latch solenoid is not considered to be the only method of controlling the orientation of the latch 124. Other devices, such as actuators, hydraulics, motors, and the like, may be used to transition the latch from the latched position to the unlatched position. One skilled in the art will understand how a solenoid, or any other similar mechanism, can be used to create substantially the same opening force a user may exert on the latch.

The locking mechanism of the vehicle may also be monitored and controlled by the controller 601 of the door opening apparatus 200. A solenoid may be located within the cavity of the door 110 in such an orientation that allows the solenoid to transition the door locking mechanism between a locked and an unlocked position. Further, a lock status indicator may be monitored by a control to signal to the door opening apparatus 200 when the door 110 is in the locked configuration.

In yet another embodiment, the door opening apparatus 200 may utilize the electronic locking mechanism that is already equipped in standard vehicles with electric locking mechanisms. Instead of implementing a solenoid or the like to control the locked state of the vehicle, door opening apparatus 200 may send an electronic signal to the door locking system that is originally manufactured in the vehicle to alter the lock status. The electronic signal may then simulate a lock or unlock command as would be expected from the vehicles control system in order to transition the vehicle locking mechanism between a locked state and an unlocked state, and vice versa.

One aspect of the present disclosure is the substantial retention of the standard vehicle door latching and locking mechanisms. By utilizing solenoids or the like that can provide similar forces as would a user, the door opening apparatus 200 can be implemented on a plurality of vehicles. Further, the user may utilize the original latch 124 to open the door using a similar unlatching procedure as would be required by the door as originally manufactured.

The door opening apparatus 200 may removeably couple to the B pillar 128. The B pillar 128 may be a substantially vertical closed steel structure welded at its bottom to the vehicle floor 120 and at its top to a roof rail or panel. The B pillar 128 may also define the substantially vertical side of the door opening 112 that is nearest a front location of the vehicle body 102. A section view 900 of the B pillar 128 is shown in FIG. 9a.

The B pillar 128 may have at least one receiver 902 spaced along the B pillar 128. The receiver 902 may define a cavity in the B pillar 128 that can removeably receive at least one alignment coupler 1002 (FIG. 10a). The receiver 902 may be disposed so that the opening of the cavity is located on a surface 904 of the B pillar 128 that substantially faces the opening 112.

The alignment coupler 1002 may be a protrusion from a front face 1004 of the door 110. When the door 110 is in the fully closed position 502, the alignment coupler 1002 may be substantially disposed within the receiver 902. The receiver 902 and the alignment coupler 1002 may align the door 110 with the vehicle body 102 when the door 110 is in the fully closed position 502. That is, the receiver 902 and the alignment coupler 1002 may have sufficient structural integrity to maintain alignment of the door 110 with the vehicle body 102 when in the fully closed position 502.

A person having skill in the art will understand that there can be more than one alignment coupler 1002 and receiver 902. In one embodiment, there may be at least two alignment couplers 1002 and receivers 902. A person having skill in the art will understand that utilizing a plurality of alignment couplers 1002 and receivers 902 may increase the structural integrity and alignment of the door 110 to the vehicle body 102 when in the fully closed position 502. This disclosure provides that any number of receivers 902 or alignment couplers 1002 may be used and is not limited to a specific configuration.

Further, while no specific size of receiver 902 and alignment coupler 1002 has been described herein, one skilled in the art will understand that a plurality of geometric shapes will work. In one non-limiting example, the alignment coupler 1002 may extend from the door 110 to create a substantially cylindrical in shape. The alignment coupler 1002 may terminate at a substantially semispherical distal portion. The receiver 902 may be inversely shaped compared to the alignment coupler 1002 and form a cavity that is sufficiently sized to allow the alignment coupler 1002 to become disposed therein. One skilled in the art will understand that in other embodiments, the alignment coupler 1002 and receiver 902 cavity may be substantially octangular, triangular, oval, rectangular or the like in cross section. Accordingly, this disclosure is not limited to any one shape for the alignment coupler 1002 or receiver 902 cavity.

The B pillar 128 may also have at least one surface coupler 906, shown in FIG. 9b, coupled thereto. The surface coupler 906 may by mounted on the surface 904 of the B pillar 128 and extend partially into the door opening 112. To better show the features of the surface coupler 906, the surface coupler 906 is shown isolated from the B pillar 128 in FIG. 9b. The surface coupler 906 may be comprised of a bracket support 908 that is configured to support a pivot coupler 910. The bracket support 908 may be coupled to the B pillar 128 and support the pivot coupler 910 at a first and second end 912, 914. The bracket support 908 may provide the necessary structure to allow the pivot coupler 910 to be sufficiently spaced from the bracket support 908 to allow a pivot bracket 1006, shown in FIG. 10a, to be pivotally and removeably coupled thereto.

The pivot bracket 1006 may be coupled to the front face 1004 of the door 110. The pivot bracket 1006 may have a slotted opening 1008 configured to removeably receive the pivot coupler 910. The slotted opening 1008 may have a curved profile that allows the pivot coupler 910 to become disposed within the slotted opening 1008 as the door 110 transitions to the fully closed position 502. More specifically, the pivot bracket 1006 may include a surface that forms part of the slotted opening 1008 and defines an arc-shaped path 1010 that is substantially similar to a portion of the path of the door 110 as it transitions to the fully closed position 502. The slotted opening 1008 may also define a closed end 1014 that partially defines a door axis 1012.

The spatial configuration of the closed end 1014 of the pivot bracket 1006 and the pivot coupler 910 of the surface coupler 906 may allow the door 110 to become removeably and pivotally coupled to the vehicle body 102. More specifically, as the door 110 moves from any open position to the fully closed position 502, the pivot coupler 910 becomes disposed within the slotted opening 1008 while the alignment coupler 1002 becomes aligned with the receiver 902. As the door 110 continues to close, the pivot coupler 910 may contact the closed end 1014 and become aligned with the door axis 1012 as the alignment coupler 1002 becomes disposed within the receiver 902 cavity. After the pivot coupler 910 is aligned with the door axis 1012, the door 110 may pivot about the door axis 1012 to the fully closed position 502 by means of the cinching assembly 302, the drive mechanism 312 and clutch assembly 314, or through a closing force applied by the user. Once the door is oriented in the fully closed position 502, the door latch 124 can hold the door 110 in the fully closed position 502.

When the door 110 is being opened from the fully closed position 502 to the fully opened position 510, the pivot coupler 910 may allow the door 110 to pivot about the door axis 1012. The door 110 may pivot about the door axis 1012 a sufficient amount before the pivot coupler 910 may travel along the arc-shaped path 1010. As the door 110 continues to transition to the fully opened position 510, the pivot coupler 910 may move out of the slotted opening 1008 and the alignment coupler 1002 may be transitioned out of the cavity created by the receiver 902. Once the pivot coupler 910 and the alignment coupler 1002 are no longer coupled to their corresponding parts of the B pillar 128, the door opening apparatus 200 can move the door 110 without being constrained by the components of the front face 1004.

The door opening apparatus 200 may depend on a plurality of electrical components such as, in part, the drive mechanism 312, a door unlatch actuator 624, a locking solenoid 626, the clutch assembly 314, the actuator 304, and a plurality of sensors. In FIG. 6, a door operation control system 600 and controller 601 are shown. A plurality of inputs 602 and outputs 604 may communicate with the controller 601 as part of the control system 600. In one embodiment, the controller 601 may receive a signal from an Original Door Sensor ("ODS") 606. The ODS 606 may be one that is typically installed in a motor vehicle to notify the occupants when a vehicle door is open. One skilled in the art will be familiar with the various types of door sensors that may be installed and their corresponding locations in a standard motor vehicle.

In one embodiment, the controller 601 communicates with the ODS 606 by connecting to the vehicle's Electronic Control Module ("ECM") or the like. When the controller 601 is coupled to the ECM of the vehicle, it can monitor the signals produced by the sensors that are installed in the vehicle by the manufacturer. In this nonexclusive embodiment, the ODS 606 may have been originally installed by the manufacturer of the vehicle and the controller 601 may communicate with the ODS 606 through the ECM.

While the controller 601 has been described as communicating to the ODS 606 through the ECM, one skilled in the art will appreciate that the ODS 606 may communicate with the controller 601 in additional ways as well. For example, the signal from the ODS 606 may be rerouted to pass through the controller 601 prior to being sent to the ECM. In this configuration, the controller 601 may not be in communication with the ECM.

In another embodiment, the ODS 606 may not be a sensor that is originally manufactured in the vehicle but rather is one that is mounted to the vehicle as part of the hardware for the door opening apparatus 200. The ODS 606 may be mounted at a plurality of locations along the door opening of the vehicle and may communicate with the controller 601 whether the door is in the fully opened position 510, the partially closed position 504, or fully closed position 502. A plurality of sensors may be used for the ODS 606 and this disclosure is not limited to any particular type of sensor.

In addition to using the ODS 606, the controller 601 may communicate with a Pivot Arm Sensor ("PAS") 608 coupled to the pivot arm 240 at the base end 246. The PAS 608 can be an absolute position sensor capable of sending a signal to the controller 601 to indicate the position of the pivot arm 240. In one embodiment, the PAS 608 can be monitored by the controller 601 to determine when the door is in the fully closed position 502, the fully opened position 510, and any position therebetween by determining the location of the pivot arm 240. In yet another embodiment, the PAS 608 may be the only sensor used to determine vehicle door orientation. Alternatively, both the ODS 606 and the PAS 608 can be simultaneously monitored by the controller 601 to determine the vehicle door orientation.

While an absolute position sensor has been specifically mentioned for the PAS 608, this disclosure is not limited to using any one type of sensor. A person having skill in the art will understand that many different types of sensors may be used to determine the vehicle door orientation. In one embodiment, a relative position sensor may be used instead of an absolute position sensor. Further, a rotary encoder may be used for the arm sensor.

The PAS 608 can also be located at a plurality of locations in door opening apparatus 200. For example, instead of being located at the base end 246 of the pivot arm 240, the PAS 608 may be located along the first member 202, the first or second sprocket 316, 318, or at the second end 242.

The controller 601 may also be in communication with a Kneel Sensor ("KS") 610. The KS 610 may be used to indicate to the controller 601 the status of a kneel assembly 611. More particularly, the KS 610 can indicate whether the vehicle is in a kneel configuration or ride configuration. The KS 610 may not be a sensor in certain embodiments. Rather, the KS 610 can be an output from a kneel assembly 611 that controls a kneeling functionality of the vehicle. The kneeling assembly 611 may provide a signal to the controller 601 to indicate the status of the kneel assembly 611 in lieu of communicating directly with a sensor. In other words, the controller 601 may communicate with a different control system to determine the kneel status instead of communicating directly with any particular sensor.

The controller 601 may communicate with a Bump Strip Sensor ("BSS") 612. The BSS 612 may be placed at a location that allows the BSS 612 to determine if an obstruction will prevent the door 110 from closing. In one embodiment, the BSS 612 may be located along a portion of the vehicle body 102 that defines the door 110 opening. In this embodiment, physical contact with the BSS 612 may send a signal to the controller 601.

The BSS 612 may also be an optical sensor. The optical sensor may determine whether there is an object in the path of the door 110 that will prohibit the door 110 from properly closing. Additionally, the BSS 612 may be a pressure sensor that monitors the forces applied by the door opening apparatus 200. The pressure sensor can measure the various forces being exerted on the door during a close or open operation and send a signal to the controller 601 if those forces exceed expected values.

The controller 601 may also receive a signal from a Ramp Position Sensor ("RPS") 614. The RPS 614 may indicate to the controller 601 the status of a ramp assembly 114. The RPS 614 may indicate to the controller 601 whether the ramp assembly 114 is clear of the door opening in the vehicle body 102 so the door 110 may transition to the fully closed position 502. The RPS 614 may be a sensor that is in direct communication with the controller 601. Alternatively, the RPS 614 may not be a sensor. Rather, the RPS 614 may be a signal sent by the ramp assembly 114 control system to the controller 601 to disclose the status of the ramp assembly 114.

The controller 601 may also be configured to receive signals from a signal receiver 616. The signal receiver 616 may send signals to the controller 601 to indicate a specific command identified by the signal receiver 616. The signal receiver 616 may receive a plurality of different commands through a plurality of different mediums. In one non-limiting example, the signal receiver 616 may receive commands to begin an open process 700 (FIG. 7) or to begin a close process 800 (FIG. 8).

The signal receiver 616 may also receive these commands through a plurality of mediums. For example, the signal receiver 616 may be configured to receive wireless signals based on a plurality of different wireless technologies like Bluetooth, Wi-Fi, infrared, satellite, cellular, radio, or the like. In one embodiment, a wireless transmitter (not shown) may be configured to send commands for the open process 700 and the close process 800 by pressing a button on the transmitter. When a button is pressed, the transmitter may send a radio signal to the signal receiver 616. The signal receiver 616 may process the signal and send the processed signal to the controller 601 to implement the desired command.

While an embodiment utilizing a transmitter that emits a radio signal is described herein, this disclosure is not limited to such a configuration. A wireless signal transmitted from a smartphone may be processed by the signal receiver 616 as well. In one example, an application for a smartphone may have a user interface that allows the user to select from a plurality of commands that may be sent to the signal receiver 616. When the user selects one of the plurality of commands on the user-interface, the smartphone may send a signal indicating the selection to the signal receiver 616. In this embodiment, the smartphone may communicate with the signal receiver 616 using any of a plurality of wireless communication protocols such as, but not limited to, Bluetooth, Wi-Fi, and/or the cellular signal.

The controller 601 may also receive signals from a Park/Reverse/Neutral/Drive Sensor ("PRNDS") 618 to determine whether a transmission of the vehicle is in a non-moving state, or "Park". One skilled in the art will understand that this type of sensor is typically installed by an automobile manufacturer. The controller 601 may utilize the sensors that are typically installed in a vehicle by the manufacturer to determine the state of the transmission. In one embodiment, the PRNDS 618 signal is obtained by the controller 601 by routing the PRNDS 618 signal of the vehicle through the controller 601 prior to routing the signal to the vehicle's ECM.

The controller 601 may also be configured to receive signals from the vehicle's ECM. The PRNDS 618 signal may be one of the plurality of signals received by the ECM. In this configuration, the controller 601 can isolate and receive the PRNDS 618 as one of the plurality of signals received from the ECM to determine the state of the transmission.

The controller 601 may also be configured to receive a signal from an Actuator Position Sensor ("APS") 620. The APS 620 may be coupled to the actuator 304 at a location that allows the APS 620 to determine the location of the cinching head 306. The APS 620 can be any of a plurality of different types of sensors as long as it can send a signal to the controller 601 indicating the location of the cinching head 306. In one embodiment, the APS 620 can be a linear contacting potentiometer, a linear variable differential transformer, a magnetostrictive sensor, a linear encoder, or the like. In yet another embodiment, there may be no APS 620. The actuator 304 may maintain a consistent neutral position 460 and the controller 601 may assume a consistent location of the cinching head 306 when the actuator 304 is in the neutral position 460.

Figure 7:
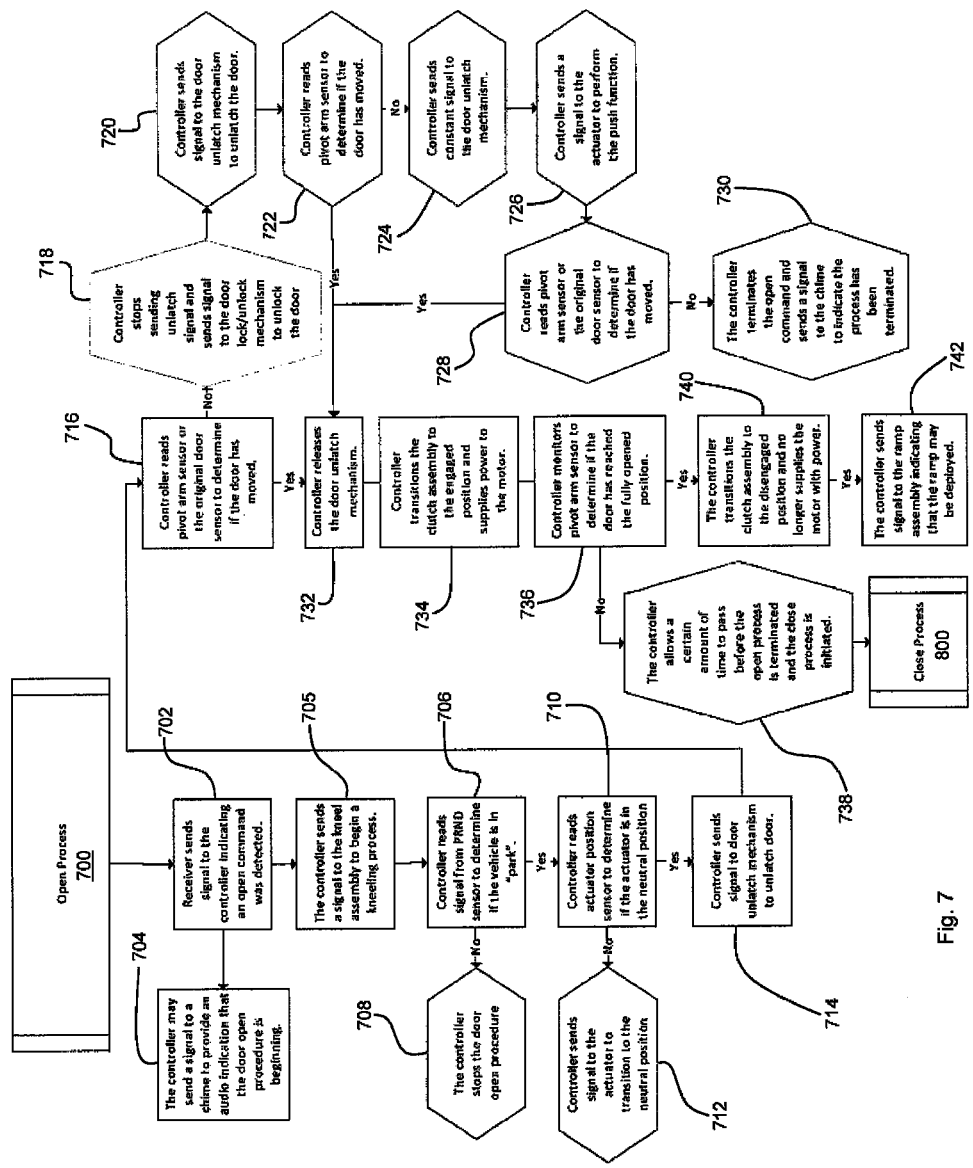
FIG. 7 illustrates a flow chart of an open process for the control system of FIG. 6.

The controller 601 may use the inputs 602 to control the outputs 604 in order to execute a door-opening process 700 shown in FIG. 7. The process or method 700 may include a plurality of blocks that are executable by the controller 601 to operably control the door 110. Each block may represent a set of instructions stored in a memory of the controller 601 such that a processor of the controller 601 may execute the instructions. The set of instructions may include software, algorithms, look-up tables, graphical information, and the like. The controller 601 may be structured to execute one or more of the plurality of blocks based on calculations or determinations made during the process 700, whereby one or more of the illustrated blocks in FIG. 7 may not be executed due to one or more conditions. The controller 601 may be programmed as such to execute the process 700 for opening the door 700 of the vehicle.

The open process 700 may be executed when the controller 601 receives a signal from the signal receiver 616 that an open command was detected in block 702 of FIG. 7. In one embodiment, the controller 601 may send a signal to a chime 622 commanding the chime 622 to generate an audio indication that the door open process 700 has begun in block 704. In a different embodiment, however, block 704 may not be executed and the open process 700 may not have any audible indication that it has been initiated.

After the controller 601 receives the open process command in block 702 from the signal receiver 616, the controller 601 may send a signal to the kneel assembly 611 to initiate a kneeling sequence in block 705. After the kneeling sequence has been initiated in block 705, block 706 may be executed such that the controller 601 monitors the signal from the PRNDS to determine if the transmission is in park. In a related aspect, block 706 may be executed by the controller 601 before block 705. If the controller 601 determines that the transmission is not in park, the door opening process 700 may be delayed or terminated 708 until the condition set forth in block 706 is true.

If, however, the controller 601 determines that the PRNDS 618 signal is indicating the transmission is in park, the process 700 may advance to block 710 and the controller 601 communicates with the APS 620. Prior to sending any commands to open the door 110, the controller 601 may use the signal from the APS 620 to ensure that the actuator 304 is oriented in the neutral position in block 710. If the controller 601 determines the actuator 304 is not in the neutral position 460, the controller 601 may send a signal to the actuator 304 to transition to the neutral position in block 712. If the actuator 304 does not transition to the neutral position within a set period of time, the open process 700 may be delayed or terminated. However, in block 714, if the actuator 304 is determined to be in the neutral position 460, the controller 601 may send a signal to the door unlatch actuator 624 to unlatch the door 110. After the controller 601 sends an unlatch signal to the door unlatch actuator 624, the controller 601 may read the signals from the ODS 606, and/or the PAS 608 to determine if the door 110 has moved in block 716.

If the controller 601 determines that the door 110 has not moved, the controller 601 may terminate the signal to the door unlatch actuator 624 and send a signal to the locking solenoid 626 to enter the unlocked state in block 718. After the controller 601 sends the unlock signal 718, the controller 601 sends another signal to the door unlatch actuator 624 to unlatch the door latching mechanism in block 720. The controller 601 may again analyze the signals received from the ODS 606, and/or the PAS 608 to determine if the door 110 has moved in block 722. If the controller 601 determines that the door 110 has moved, the controller 601 will execute block 732. However, if the controller 601 determines that the door 110 has not moved after executing block 722, the controller 601 may send a constant signal to the door unlatch actuator 624 to hold the door 110 in the unlatched position in block 724. While the controller 601 sends the constant signal to the door unlatch actuator 624, the controller 601 also sends a signal to the actuator 304 to perform a push function in block 726. After the push function has been executed in block 726, the controller 601 may again analyze the signals received from the ODS 606, and/or the PAS 608 to determine if the door 110 has moved in block 728. If the controller 601 determines that the door 110 has moved, the process advances to block 732. However, if the controller 601 determines the door 110 has not moved, the controller 601 terminates the open process 700 and may send a signal to the chime 622 to indicate that the open process 700 has been terminated via block 730.

In block 732, if the controller 601 receives an indication that the door 110 has moved, the controller 601 may stop sending an unlatch signal to the door unlatch actuator 624. Subsequently the controller 601 may transition the clutch assembly 314 to the engaged position while the controller 601 also sends a signal to the drive mechanism 312 to begin rotating in block 734. The controller 601 may then monitor the PAS 608 to determine whether the door 110 has reached a fully open position in block 736. If the PAS 608 fails to send a signal to the controller 601 indicating the door is in the fully opened position 510, the controller 601 may monitor the PAS 608 for a set amount of time before terminating the open process 700 and initiating the close process in block 738.

However, if the PAS 608 sends a signal to the controller 601 indicating the door 110 has reached the fully opened position 510, the controller 601 may transition the clutch assembly 314 to the disengaged position and switch the drive mechanism 312 to an unpowered state in block 740. Finally, the controller 601 may send a signal to the ramp assembly 114 to begin a ramp deployment protocol in block 742.

While one example of the door opening process 700 is shown in FIG. 7 and described above by which the controller 601 can execute the process 700, this disclosure is not limited to the particular details described herein. Moreover, the blocks are shown and described in a certain sequential order. In other embodiments, however, the process 700 may be executed in a plurality of different orders. Other blocks may be executed by the controller 601 in a different embodiment, whereas some of the blocks illustrated in FIG. 7 may not be executed in yet other embodiments. For example, in one embodiment the door opening process 700 may not have a chiming mechanism to indicate the door opening process 700 has begun. Further, a visual indicator may be used instead of the audible door chime 622 to indicate the status of the controller 601 to a user. Further still, some features described herein may not be used at all. For example, the push function described in block 726 may not be executed during the open process 700. In this embodiment, the process 700 may be cancelled or terminated if the door does not move after block 722.

When the door 110 is in the fully opened position 510, the user may initiate or trigger a door closing process 800 as shown in FIG. 8 by sending a signal to the signal receiver 616. This may be done by pressing a button on a key fob or any other known way. To execute the close process 800, the controller 601 may receive a signal from the signal receiver 616 indicating that a user desires to move the door 110 to the fully closed position in block 802. In one embodiment, the controller 601 may send a command to the chime 622 to emit an audible signal indicating the closing process 800 has begun in block 804. The controller 601 may also monitor the RPS 614 to determine whether the ramp assembly 114 is in the stowed position before continuing the closing process in block 806. In any event, the controller 601 may first communicate with the PRNDLS 618 to detect and verify if the vehicle is parked. If not, the door closing process 800 may be delayed for a waiting period (e.g., a few seconds) or terminated until the vehicle is parked.

If the controller 601 determines that the ramp assembly 114 is not in the stowed position, the controller 601 may engage the clutch assembly 314 and electrically lock the drive mechanism 312 to prevent the door 110 from moving in block 808. While the door 110 is electrically locked, the controller 601 may monitor the ramp assembly 114 to ensure that a stow process is initiated or completed in block 810. The controller 601 may then monitor the RPS 614 for a set period of time to determine if the ramp assembly 114 moves to the stowed orientation in block 812. If the controller 601 determines that the ramp assembly 114 does not move to the stowed orientation, the controller 601 may delay or terminate the process 800.

If the controller 601 determines that the ramp assembly 114 is in the stowed orientation, either in block 806 or block 812, the controller 601 may send a signal to the kneel assembly 611 to begin transitioning out of a kneel position in block 814. In block 816, the controller 601 may also engage the clutch assembly 314 and the drive mechanism 312 to begin transitioning the door to the fully closed position. During the closing process, the BSS 612 may be continually monitored by the controller 601 to determine whether there are any obstructions that may keep the door 110 from fully closing in block 818. If the controller 601 does get signals from the BSS 612 indicating the existence of an obstruction, the controller 601 may delay or terminate the close process 800 and initiation the open process in block 820.

If the controller 601 determines that the door 110 is clear of obstructions, the controller 601 may continue to monitor the BSS 612, the PAS 608, and/or the ODS 606 to determine whether the door 110 enters into the fully or partially latched state in block 822. In block 824, if the controller 601 determines that the door 110 fails to enter the partially or fully latched state after a certain amount of time, the close process 800 may be terminated and the open process 700 may be implemented. However, if the controller 601 determines the partially closed position 504 is achieved, the controller 601 may activate the actuator 304 to begin cinching the door 110 to the fully closed position in block 826. While door 110 is being cinched to the fully closed position 502, the controller 601 may continue to monitor the BSS 612, the PAS 608, and/or the ODS 606 to determine whether the door 110 enters into the fully closed position in block 828. In block 830, once the controller 601 determines the fully closed position 502 is achieved, the controller 601 returns the actuator to the neutral position 460 and ends the close process 800.

Neither the open process 700 nor the close process 800 is intended to be limited to any particular arrangement of the blocks. Many of the blocks described above may be executed in a different order or simultaneously with one another as one skilled in the art will understand. Accordingly, this disclosure should not be limited to the particular order of blocks described herein. Moreover, in other embodiments, additional blocks may be executed in either the open process 700 or close process 800.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A motorized vehicle, comprising:
  a body frame mounted on a chassis, where the chassis is adapted to support a vehicle powertrain and a plurality of wheels;
  a vehicle floor coupled to the body frame and chassis;
  a ramp assembly coupled to the vehicle floor, the ramp assembly being configurable in at least a stowed position and a deployed position to enable the wheelchair-occupied passenger ingress and egress to and from the interior;
  a door coupled to the body frame, the door configured to move between an open position and a closed position to provide access to an interior of the vehicle;
  a door assembly including:
    a first member defining a first axis;
    a first support member pivotally coupled to the door and defining a second axis;
  a linkage assembly including a first arm and a second arm, the first arm and the second arm being pivotally coupled to one another, where the first arm is coupled to the first member at a location offset from the first axis and the second arm defines a first slot; and
  a cross member having a first end and a second end, the first end having a first pin for slideably engaging the first slot and the second end being coupled to the first member;
  wherein, the door is movable between the open and closed positions as the first member pivots about the first axis.

2. The motorized vehicle of claim 1, further comprising a bracket defining a second slot therein, the bracket being pivotably coupled to the first member at a first location and the first arm at a second location, where the first location is spaced from the second location.

3. The motorized vehicle of claim 2, wherein the second slot comprises a profile having a first portion and a second portion, the first portion defined by a first radius and the second portion defined by a second radius;
  wherein the first radius and second radius are different from one another.

4. The motorized vehicle of claim 2, further comprising:
  a second support member defining a third axis, the third axis being spaced from and parallel to the first and second axes; and
  a connecting arm pivotally coupled to the first support member and the second support member.

5. The motorized vehicle of claim 4, wherein the connecting arm is pivotally coupled to the first support member about the second axis and pivotally coupled to the second support member about the third axis.

6. The motorized vehicle of claim 4, further comprising:
  a third arm defining a third slot and including a second pin;
  wherein, the connecting arm includes a third pin;
  further wherein, the third pin is slidably disposed within the third slot and the second pin is slidably coupled to the second slot.

7. The motorized vehicle of claim 1, further comprising:
a plurality of pillars forming part of the body frame, the plurality of pillars including at least a first pillar, a second pillar, and a third pillar, where the first pillar is disposed near a front end of the vehicle and the third pillar is disposed near a rear end thereof; and
at least a second door coupled to the body frame and providing access to an interior of the vehicle.

8. A motorized vehicle, comprising:
a chassis;
a powertrain and a plurality of wheels supported by the chassis;
a body frame mounted on the chassis;
a door coupled to the body frame, the door configured to move between an open position and a closed position to provide access to an interior of the vehicle;
a first member defining a first axis;
a first support member pivotally coupled to the door and defining a second axis;
a linkage assembly including a first arm and a second arm, the first arm and the second arm being pivotally coupled to one another, where the first arm is coupled to the first member at a location offset from the first axis and the second arm defines a first slot;
a cross member having a first end and a second end, the first end having a first pin for slideably engaging the first slot and the second end being coupled to the first member; and
a drive assembly operably coupled to the first member;
wherein, the door is movable between the open and closed positions as the drive assembly operably drives the first member about the first axis.

9. The motorized vehicle of claim 8, further comprising:
a vehicle floor coupled to the body frame and chassis; and
a ramp assembly coupled to the vehicle floor, the ramp assembly being configurable in at least a stowed position and a deployed position to enable the wheelchair-occupied passenger ingress and egress to and from the interior.

10. The motorized vehicle of claim 8, wherein the drive assembly comprises:
a motor;
a gear set coupled to the motor; and
a clutch assembly being disposable in an engaged position and a disengaged position,
wherein, the motor is operably coupled to the first member in the engaged position and decoupled therefrom in the disengaged position.

11. The motorized vehicle of claim 10, wherein the drive assembly comprises:
a first sprocket coupled to the clutch assembly;
a second sprocket coupled to the first member; and
a drive chain coupled between the first sprocket and the second sprocket;
wherein the motor operably drives the first and second sprockets via the drive chain in the engaged position.

12. The motorized vehicle of claim 8, further comprising:
a bracket including a pin, the bracket being coupled to the door;
a cinching head having an open end that defines a first angled portion and a second angled portion; and
an actuator coupled to the first member at a first end and the cinching head at a second end, where a movement of the actuator moves the cinching head in a first axial direction;
wherein, the movement of the cinching head in the first axial direction induces a movement of the bracket in a second axial direction, wherein the second axial direction is substantially perpendicular to the first axial direction.

13. The motorized vehicle of claim 8, further comprising a spring mechanism coupled to the first member;
wherein, the spring mechanism is disposable on a first side of the first axis to provide a force to maintain the door in the closed position;
further wherein, the spring mechanism is disposable on a second side of the first axis to provide a force to maintain the door in the open position.

14. A vehicular system, comprising:
a body frame defining an interior;
a door coupled to the body frame, the door configured to move between an open position and a closed position to provide access to the interior;
a door assembly including:
    a first member defining a first axis;
    a first support member pivotally coupled to the door and defining a second axis;
    a linkage assembly including a first arm and a second arm, the first arm and the second arm being pivotally coupled to one another, where the first arm is coupled to the first member at a location offset from the first axis and the second arm defines a first slot; and
    a cross member having a first end and a second end, the first end having a first pin for slideably engaging the first slot and the second end being coupled to the first member;
a control system including a controller having a plurality of inputs and a plurality of outputs;
wherein, the door is movable between the open and closed positions as the first member pivots about the first axis.

15. The vehicular system of claim 14, further comprising a pivot arm sensor coupled to the first arm and configured to detect a position of the door relative to a current position of the first arm;
wherein, the pivot arm sensor is disposed in electrical communication with one of the plurality of inputs of the controller for communicating the position of the door thereto.

16. The vehicular system of claim 14, further comprising:
a ramp assembly coupled to the body frame, the ramp assembly being configurable in at least a stowed position and a deployed position to enable a wheelchair-occupied passenger ingress and egress to and from the interior; and
a ramp position sensor disposed in electrical communication with one of the plurality of inputs of the controller for communicating the position of the ramp assembly thereto.

17. The vehicular system of claim 14, further comprising:
a drive assembly operably coupled to the first member;
a cinching assembly including an actuator and a cinching head, the actuator being coupled to the first member at a first end and the cinching head at a second end;
a door actuator and a solenoid, the door actuator disposed in electrical communication with one of the plurality of outputs of the controller and the solenoid disposed in electrical communication with another of the plurality of outputs thereof; and
an actuator position sensor disposed in electrical communication with one of the plurality of inputs of the controller, the actuator position sensor coupled to the actuator to detect a position of the cinching head and communicate said detected position to the controller;

wherein, the controller is disposed in electrical communication with the drive assembly and cinching assembly to control movement of the door between the open and closed positions.

18. The vehicular system of claim 14, further comprising:
a kneel assembly coupled to the body frame, the kneel assembly adapted to move the body frame between a kneel configuration and a ride configuration; and
a kneel sensor disposed in electrical communication with one of the plurality of inputs of the controller, the kneel sensor detecting either the kneel configuration or ride configuration and communicating said detected configuration to the controller.

19. The vehicular system of claim 14, further comprising a bump strip sensor disposed in electrical communication with one of the plurality of inputs of the controller, the bump strip sensor coupled to the body frame, door, or door assembly, wherein the bump strip sensor is configured to detect an object at least partially disposed in a path travelled by the door between the open and closed positions and communicate said detection to the controller.

20. The vehicular system of claim 14, further comprising a signal receiver electrically coupled to one of the plurality of inputs of the controller, the signal receiver being in electrical communication with a transmitter for detecting an instruction to open or close the door, wherein the signal receiver is configured to receive the instruction and communicate the instruction to the controller.

* * * * *